US008134761B2

(12) United States Patent
Yachida

(10) Patent No.: US 8,134,761 B2
(45) Date of Patent: Mar. 13, 2012

(54) DOCUMENT PROCESSING APPARATUS, METHOD THEREOF, AND PROGRAM PRODUCT FOR EXECUTING THE METHOD

(75) Inventor: Masuyoshi Yachida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1414 days.

(21) Appl. No.: 11/625,035

(22) Filed: Jan. 19, 2007

(65) Prior Publication Data

US 2007/0171485 A1 Jul. 26, 2007

(30) Foreign Application Priority Data

Jan. 20, 2006 (JP) .................... 2006-013166

(51) Int. Cl.
*H04N 1/04* (2006.01)
*H04N 1/32* (2006.01)

(52) U.S. Cl. ........ 358/486; 358/474; 358/442; 358/444; 358/468

(58) Field of Classification Search ............... 358/1.15, 358/468, 442, 474, 444, 505; 382/312, 318, 382/319
See application file for complete search history.

(56) References Cited

U.S. PATENT DOCUMENTS

| 5,764,866 | A * | 6/1998 | Maniwa ................... 358/1.15 |
| 6,289,119 | B1 * | 9/2001 | Nagata .................... 382/162 |
| 6,867,881 | B1 * | 3/2005 | Umezato ................... 358/1.2 |
| 2002/0027675 | A1 * | 3/2002 | Minato .................... 358/1.15 |
| 2002/0093675 | A1 * | 7/2002 | Matsuda ................... 358/1.15 |
| 2002/0145765 | A1 * | 10/2002 | Chou ...................... 358/474 |
| 2004/0128555 | A1 * | 7/2004 | Saitoh et al. .............. 713/201 |
| 2006/0020808 | A1 * | 1/2006 | Yachida et al. ............ 713/176 |
| 2008/0123162 | A1 * | 5/2008 | Sugiura ................... 358/488 |
| 2008/0134027 | A1 * | 6/2008 | Saeki et al. ............... 715/274 |
| 2008/0137156 | A1 * | 6/2008 | Ono ....................... 358/486 |
| 2010/0046038 | A1 * | 2/2010 | Matsuda et al. ............ 358/434 |

FOREIGN PATENT DOCUMENTS

| JP | 11252328 A * | 9/1999 |
| JP | 2000-295468 | 10/2000 |
| JP | 2000-341454 | 12/2000 |
| JP | 2001-217980 | 8/2001 |
| JP | 2001285534 A * | 10/2001 |
| JP | 2003029629 A * | 1/2003 |

(Continued)

OTHER PUBLICATIONS

Japanese Office Action issued Feb. 15, 2011, in Patent Application No. 2006-013166.

*Primary Examiner* — Cheukfan Lee
(74) *Attorney, Agent, or Firm* — Oblon, Spivak, McClelland, Maier & Neustadt, L.L.P.

(57) ABSTRACT

A document processing apparatus which scans a document is disclosed. The document processing apparatus includes a scanning condition managing unit for managing plural scanning conditions to be applied to the document based on a category of the document, a scanning request obtaining unit for obtaining a scanning request for the document via a network, a document category determining unit, a scanning condition determining unit, and a condition inputting unit. The document is scanned based on the scanning condition determined by the scanning condition determining unit, and the condition inputting unit, based on a result determined by the scanning condition determining unit, replaces a part of the scanning condition to be applied to the document, which is the object of the scanning request, with another scanning condition.

17 Claims, 34 Drawing Sheets

FOREIGN PATENT DOCUMENTS

| | | |
|---|---|---|
| JP | 2003-296742 | 10/2003 |
| JP | 2004-110825 | 4/2004 |
| JP | 2004-265140 | 9/2004 |
| JP | 2004-303223 | 10/2004 |
| JP | 2004-310463 | 11/2004 |
| JP | 2006-33728 | 2/2006 |

* cited by examiner

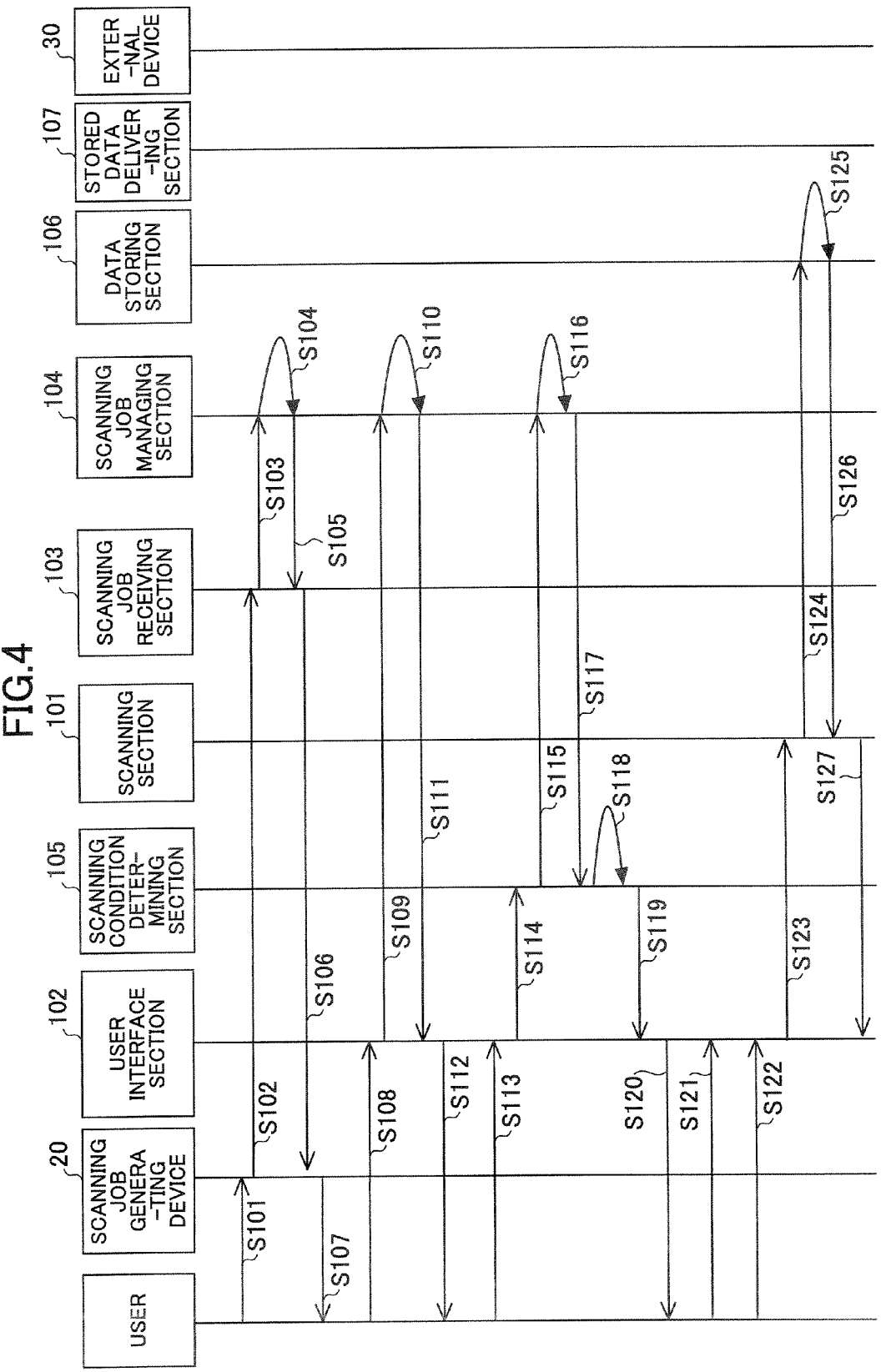

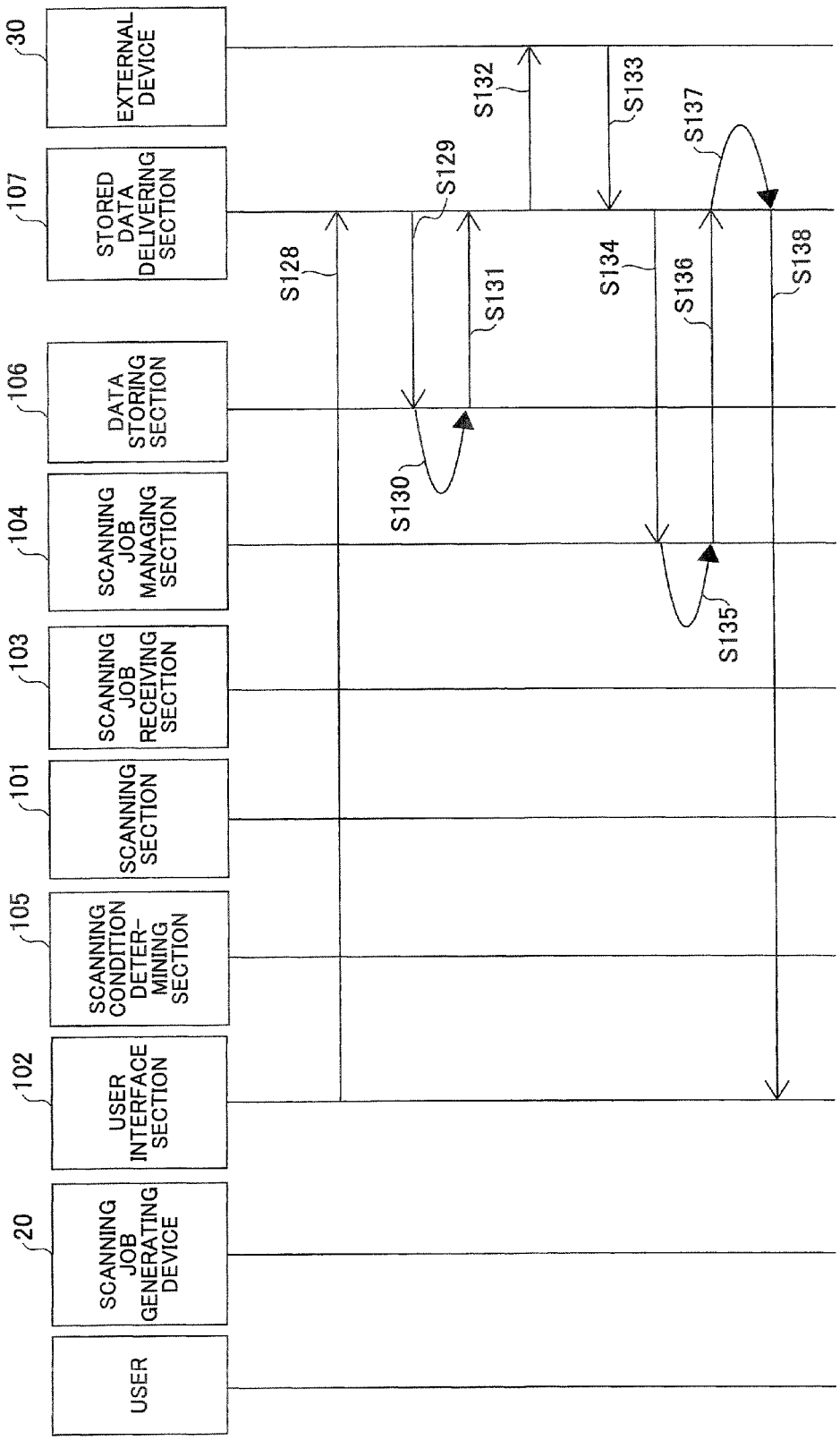

FIG. 6

```
<SOAP-ENV:Envelope xmlns:SOAP-ENV="http://schemas.xmlsoap.org/soap/envelope/"
 xmlns:SOAP-ENC="http://schemas.xmlsoap.org/soap/encoding/"
 xmlns:xsi="http://www.w3.org/2001/XMLSchema-instance"
 xmlns:xsd="http://www.w3.org/2001/XMLSchema"
<SOAP-ENV:Body>
<ScanIdentifier>Iduuid:12345679</ScanIdentifier>        ~ r101-1
<ScanTicket>
  <JobDescription>
    <JobName>Invoice of Purchased Item</JobName>        ~ r101-21
    <JobOriginatingUserName>Taro Yamada</JobOriginatingUserName>  ~ r101-22
    <UserAuthentication>required</UserAuthentication>   ~ r101-23
  </JobDescription>
  <DestinationURL>https://document-server.domain.co.jp</DestinationURL>  ~ r101-3
  <JobParameters>
    <DocumentCategory>Invoice</DocumentCategory>        ~ r101-41
  </JobParameters>
  <DocumentDescription>
    <DocumentName>Scan12345679.tif</DocumentName>       ~ r101-5
  </DocumentDescription>
  <ScanParameterModification>
    <ParameterModification>Restricted</ParameterMdification>  ~ r101-61
  </ScanParameterModification>
</ScanTicket>
</SOAP-ENV:Body>
</SOAP-ENV:Envelope>
``` r101 r101-2 { JobDescription block }
r101-4 { JobParameters block }
r101-6 { ScanParameterModification block }
r101-10 { ScanTicket block }

FIG.7

```
<ScanTemplate>
  <DocumentCategory>Invoice</DocumentCategory>  ~ 109-1
  <JobParameter>
  <DestinationURL>https://finantial-info.domain.co.jp</DestinationURL>
  </JobParamters>
  <DocumentParameters>
109-21 { <DocumentFormat AllowedValues=" exif jfiff tiff-multi pdf">pdf
         </DocumentFormat>
109-22 { <DocumentSizeAutoDetect AllowedValues="true false">true
         </DocumentSizeAutoDetect>
  <DocumentInputSource AllowedValues="Platen ADF" >ADF
  </DocumentInputSource>
  <ColorProcessing>
109-23 { <ColorEncoding AllowedValues="Binary Grayscale Color">
         Grayscale</ColorEncoding>
109-24 — <ColorPlanes>1</ColorPlanes>
109-25 — <ColorBitsPerPlane>8</ColorBitsPerPlane>
  </ColorProcessing>
109-26 — <Resolution AllowedValues="100 150 200 300">100</Resolution>
  </DocumentParamters>
  <DocumentDescription>
  <CompressionType AllowedValues=" none jpeg g4 jpeg2000">
  jpeg</CompressionType>
  </DocumentDescription>
  </Job>
</ScanTemplate>
```

109-2 encompasses the DocumentParameters block.

FIG.12

```
                                                                    r201
┌─────────────────────────────────────────────────────────────────┐
│    <SOAP-ENV:Envelope xmlns:SOAP-                               │
│    ENV="http://schemas.xmlsoap.org/soap/envelope/"              │
│      xmlns:SOAP-ENC="http://schemas.xmlsoap.org/soap/encoding/" │
│      xmlns:xsi="http://www.w3.org/2001/XMLSchema-instance"      │
│      xmlns:xsd="http://www.w3.org/2001/XMLSchema"               │
│      <SOAP-ENV:Body>                                            │
│        <ScanIdentifier>ScanId:12345678</ScanIdentifier>  ～ r201-1│
│        <ScanTicket>                                             │
│          <JobDescription>                                       │
│            <JobName>Receipt</JobName>                           │
│   r201-2    <UserName>Taro Yamada</UserName>                    │
│            <UserAuthentication>required</UserAuthentication>    │
│          </JobDescription>                                      │
│          <DestinationURL>                                       │
│   r201-3    https://document-server.domain.co.jp                │
│          </DestinationURL>                                      │
│          <DocumentParameters>                                   │
│            <DocumentFormat>tiff-multi</DocumentFormat> — r201-41│
│            <DocumentInputSize>A4</DocumentInputSize>   — r201-42│
│            <DocumentInputSource>ADF</DocumentInputSource>— r201-43│
│            <Resolution>200</Resolution>  — r201-44              │
│            <ColorPapameters>                                    │
│   r201-4     <ColorEncoding>Color</ColorEncoding> — r201-45     │
│              <ColorPlanes>3</ColorPlanes> — r201-46             │
│r201-10       <ColorSpace>RGB</ColorSpace> — r201-47             │
│              <ColorBitsPerPlane>8</ColorBitsPerPlane>— r201-48  │
│            </ColorParameters>                                   │
│          </DocumentParameters>                                  │
│          <ScanParameterModification>                            │
│            <ParameterModification>Ristricted</ParameterMdification>— r201-51│
│            <ModifiableParameter>                                │
│              <ColorPlanes Min=3> 3 </ColorPlanes>— r201-521    ⎫│
│   r201-5     <ColorBitsPerPlane Min=8> 8 </ ColorBitsPerPlane> —r201-522 ⎬ r201-52│
│              <Resolution Min=200> 200 </Resolution>— r201-523  ⎭│
│            </ModifiableParameter>                               │
│          </ScanParameterModification>                           │
│            <DocumentFilename>                                   │
│              <DocumentName>Scan12345678.tif</DocumentName> — r201-6│
│            </DocumentFilename>                                  │
│        </ScanTicket>                                            │
│      </SOAP-ENV:Body>                                           │
│    </SOAP-ENV:Envelope>                                         │
└─────────────────────────────────────────────────────────────────┘
```

FIG.24

```
<SOAP-ENV:Envelope xmlns:SOAP-ENV="http://schemas.xmlsoap.org/soap/envelope/"
xmlns:SOAP-ENC="http://schemas.xmlsoap.org/soap/encoding/"
xmlns:xsi="http://www.w3.org/2001/XMLSchema-instance"
xmlns:xsd="http://www.w3.org/2001/XMLSchema">
<SOAP-ENV:Body>
<ScanIdentifier>Iduuid:12345679</ScanIdentifier>
<ScanTicket>
<JobDescription>
    <JobName>Receipt of Purchased Item</JobName>  ~r401-1
    <JobOriginatingUserName>Taro Yamada</JobOriginatingUserName>
    <UserAuthentication>required</UserAuthentication>
</JobDescription>
<DestinationURL>https://document-server.domain.co.jp</DestinationURL>
</JobParameters>
<DocumentParameters>
    <DocumentCategory>Receipt</DocumentCategory>  ~r401-2
</DocumentParameters>
<DocumentDescription>
    <DocumentName>Scan12345679.tif</DocumentName>
</DocumentDescription>
<ScanParameterModification>
<ParameterModification>Restricted</ParameterMdification>
</ScanParameterModification>
</ScanTicket>
</SOAP-ENV:Body>
</SOAP-ENV:Envelope>
``` r401

FIG.25

```
<ScanTemplate>
  <DocumentCategory>Receipt</DocumentCategory>   ~109c-1
  <JobParameter>
    <DestinationURL>https://finantial-info.domain.co.jp</DestinationURL>
  </JobParameters>
  <DocumentParameters>
    <DocumentFormat AllowedValues=" exif jfif tiff-multi pdf">pdf
    </DocumentFormat>
    <DocumentSizeAutoDetect AllowedValues="true false">true
    </DocumentSizeAutoDetect>
    <DocumentInputSource AllowedValues="Platen ADF" >ADF
    </DocumentInputSource>
    <ColorProcessing>
      <ColorEncoding AllowedValues=" Color">          ⎫
      Color</ColorEncoding>                            ⎬ 109c-2
      <ColorPlanes>3</ColorPlanes>  ~109c-3            ⎭
      <ColorBitsPerPlane>8</ColorBitsPerPlane>
    </ColorProcessing>
    <Resolution AllowedValues="200 300 400 600">200</Resolution>  ~109c-4
    <CompressionType AllowedValues=" none jpeg g4 jpeg2000">
    jpeg</CompressionType>
    <DigitalSignature>                                              ⎫
      <MachineSignature AllowedValues="True False">True</MacineSignarure>  ~109c-51
      <UserSignature AllowedValues="True False">False</UserSignature>      ~109c-52
      <TimeStamp AllowedValues="True False">True</TimeStamp>               ~109c-53
    </DigitalSignature>                                             ⎭
109c-5
  </DocumentParamters>
  <DocumentDescription>
  </DocumentDescription>
  </Job>
</ScanTemplate>
```

109c

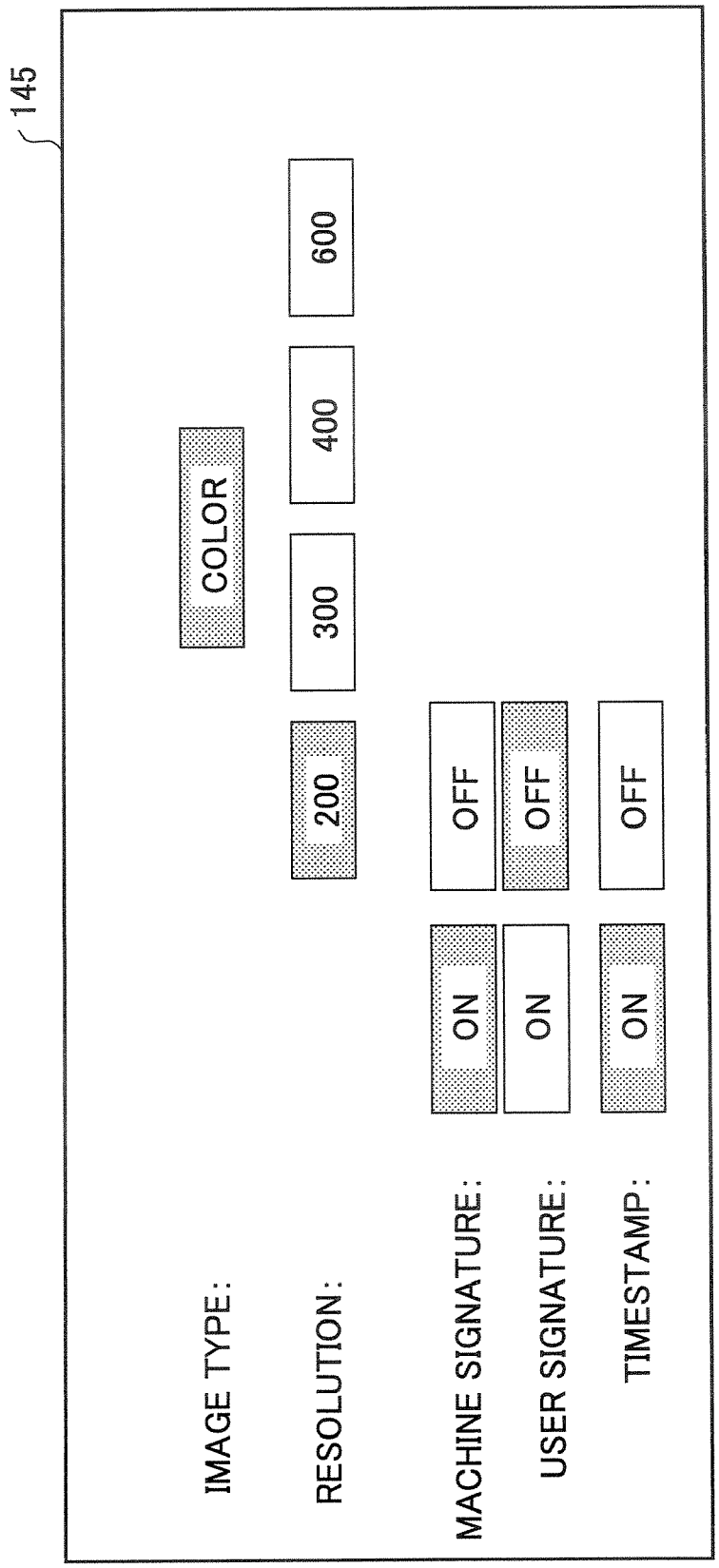

FIG.27    r402

```
<SOAP-ENV:Envelope xmlns:SOAP-
ENV="http://schemas.xmlsoap.org/soap/envelope/"
  xmlns:SOAP-ENC="http://schemas.xmlsoap.org/soap/encoding/"
  xmlns:xsi="http://www.w3.org/2001/XMLSchema-instance"
  xmlns:xsd="http://www.w3.org/2001/XMLSchema"
<SOAP-ENV:Body>
<ScanIdentifier>ScanId:12345678</ScanIdentifier>
<ScanTicket>
    <JobDescription>
        <JobName>Receipt</JobName>
        <UserName>Taro Yamada</UserName>
        <UserAuthentication>required</UserAuthentication>
    </JobDescription>
    <DestinationURL>
        https://document-server.domain.co.jp
    </DestinationURL>
    <DocumentParameters>
        <DocumentFormat>tiff-multi</DocumentFormat>
        <DocumentInputSize>A4</DocumentInputSize>
        <DocumentInputSource>ADF</DocumentInputSource>
        <Resolution>200</Resolution>
        <ColorPapameters>
            <ColorEncoding>Color</ColorEncoding>
            <ColorPlanes>3</ColorPlanes>
            <ColorSpace>RGB</ColorSpace>
            <ColorBitsPerPlane>8</ColorBitsPerPlane>
        </ColorParameters>
    </DocumentParameters>
    <ScanParameterModification>
        <ParameterModification>Ristricted</ParameterMdification>
    <ModifiableParameter>
        <ColorPlanes Min=3> 3 </ColorPlanes>
        <ColorBitsPerPlane Min=8> 8 </ ColorBitsPerPlane>
        <Resolution Min=200> 200 </Resolution>
    </ModifiableParameter>
    </ScanParameterModification>
  <DocumentDescription>
       <DigitalSignature>
          <MachineSignature>True</MacineSignarure>
r402-1  <UserSignature>False</UserSignature>
          <TimeStamp>True</TimeStamp>
       </DigitalSignature>
  </DocumentDescription>
        <DocumentFilename>
            <DocumentName>Scan12345678.tif</DocumentName>
        </DocumentFilename>
</ScanTicket>
</SOAP-ENV:Body>
</SOAP-ENV:Envelope>
```

FIG.29

```
<SOAP-ENV:Envelope xmlns:SOAP-ENV="http://schemas.xmlsoap.org/soap/envelope/"
 xmlns:SOAP-ENC="http://schemas.xmlsoap.org/soap/encoding/"
 xmlns:xsi="http://www.w3.org/2001/XMLSchema-instance"
 xmlns:xsd="http://www.w3.org/2001/XMLSchema">
<SOAP-ENV:Body>
<nscnjbjb:ScanIdentifier>Iduuid:12345679</ScanIdentifier>
<ScanTicket>
 <JobDescription>
  <JobName>Receipt of Purchased Item</JobName>
  <JobOriginatingUserName>Taro Yamada</JobOriginatingUserName>
 </JobDescription>
  <DestinationURL>https://document-server.domain.co.jp </ DestinationURL>
 </JobParameters>
 <DocumentParameters>
  <DocumentCategory>Receipt</DocumentCategory>
 </DocumentParameters>
 <DocumentDescription>
  <DocumentName>Scan12345679.tif</DocumentName>
 </DocumentDescription>
 <ScanParameterModification>
  <ParameterModification>Prohibited</ParameterMdification>      r403-1
 </ScanParameterModification>
</ScanTicket>
</SOAP-ENV:Body>
</SOAP-ENV:Envelope>
``` r403

FIG. 31

```
                                                                    ┌109d
<ScanTemplate>
   <DocumentCategory>Receipt</DocumentCategory>
      <JobParameter>
   <DestinationURL>https://finantial-info.domain.co.jp</ DestinationURL>
   </JobParameters>
   <DocumentParameters>
         <DocumentFormat AllowedValues="exif jfif tiff-multi pdf">pdf
            </DocumentFormat>
         <DocumentInputSize>
            <DocumentSizeAutoDetect AllowedValues="true false">true
               </DocumentSizeAutoDetect>
         </DocumentInputSize>
         <DocumentInputSource AllowedValues="Platen ADF" >ADF
            </DocumentInputSource>
         <ColorProcessing>
            <ColorEncoding AllowedValues=" Color">
               Color</ColorEncoding>
               <ColorPlanes>3</ColorPlanes>
               <ColorBitsPerPlane>8</ColorBitsPerPlane>
         </ColorProcessing>
         <Resolution AllowedValues="200 300 400 600">200</Resolution>
   </DocumentParamters>
   <DocumentDescription>
         <CompressionType AllowedValues="none jpeg g4 jpeg2000">
            jpeg</CompressionType>
         <DigitalSignature>
            <MachineSignature AllowedValues="True
False">True</MacineSignarure>
         <UserSignature AllowedValues="True False">False</UserSignature>
         <TimeStamp AllowedValues="True False">True</TimeStamp>
         </DigitalSignature>
   </DocumentDescription>
   <ScanParameterModification>
      <ParameterOverride>True</ParameterOverride>～ 109d-1
   </ScanParameterModification>
   </Job>
</ScanTemplate>
```

FIG. 32

```
                                                                r501
<SOAP-ENV:Envelope xmlns:SOAP-
ENV="http://schemas.xmlsoap.org/soap/envelope/"
   xmlns:SOAP-ENC="http://schemas.xmlsoap.org/soap/encoding/"
   xmlns:xsi="http://www.w3.org/2001/XMLSchema-instance"
   xmlns:xsd="http://www.w3.org/2001/XMLSchema"
<SOAP-ENV:Body>
<nscnjbjb:ScanIdentifier>Iduuid:12345679</ScanIdentifier>
<ScanTicket>
   <JobDescription>
      <JobName>Receipt of Purchased Item</JobName>
      <JobOriginatingUserName>Taro Yamada</JobOriginatingUserName>
   </JobDescription>
         <DestinationURL>https://document-server.domain.co.jp </
DestinationURL>
   </JobParameters>
      <DocumentParameters>
         <DocumentCategory>Receipt</DocumentCategory>
         <Resolution>400</Resolution>  ~ r501-1
      </DocumentParameters>
      <DocumentDescription>
         <DocumentName>Scan12345679.tif</DocumentName>
      </DocumentDescription>
      <DocumentDescription>
         <DigitalSignature>
            <MachineSignature>True</MacineSignarure>
            <UserSignature>True</UserSignature>        r501-2
            <TimeStamp>True</TimeStamp>
         </DigitalSignature>
      </DocumentDescription>
      <ScanParameterModification>
         <ParameterModification>Prohibited</ParameterMdification> ~ r501-3
      </ScanParameterModification>
   </ScanTicket>
</SOAP-ENV:Body>
</SOAP-ENV:Envelope>
```

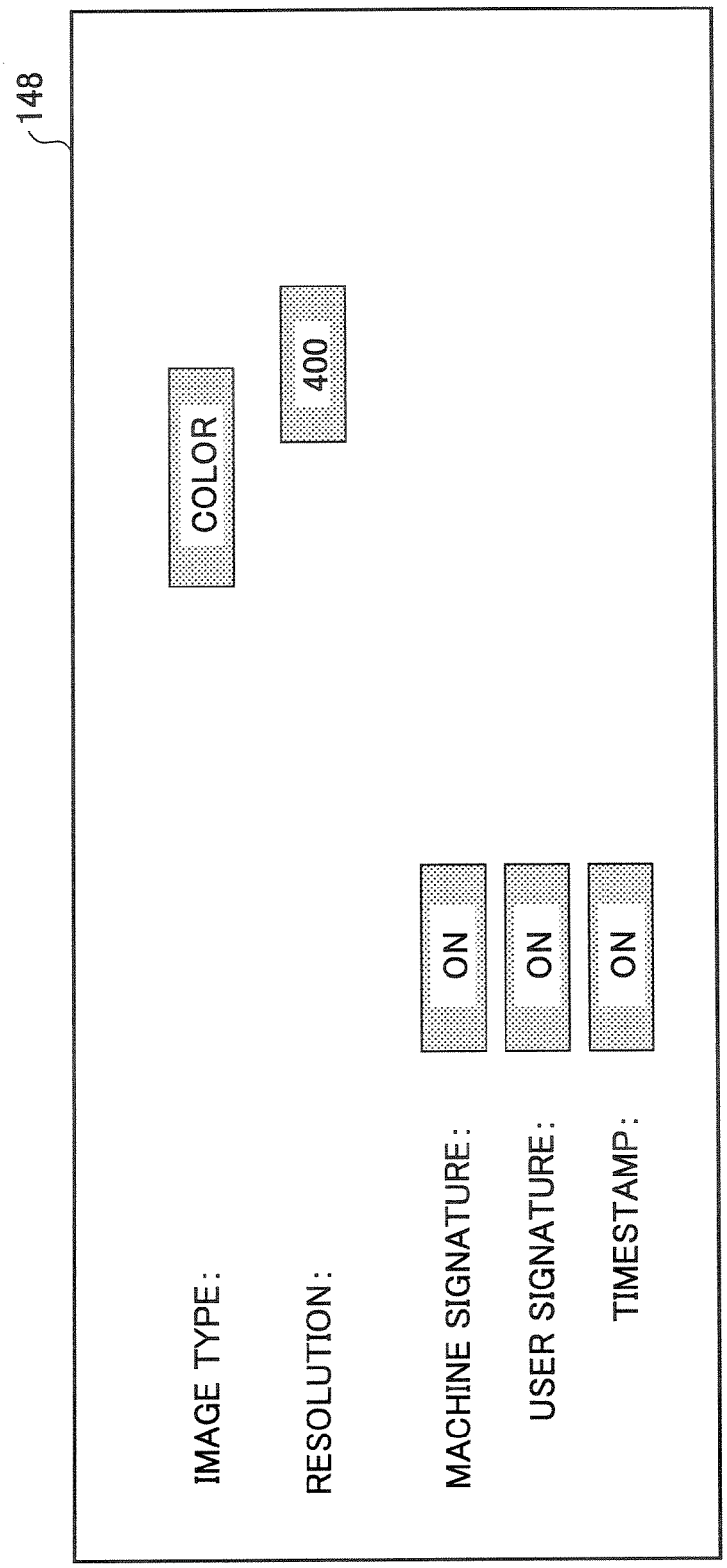

DOCUMENT PROCESSING APPARATUS, METHOD THEREOF, AND PROGRAM PRODUCT FOR EXECUTING THE METHOD

BACKGROUND OF THE INVENTION

1. Field of the Invention

The present invention generally relates to a document computerizing apparatus, a method thereof, and a program product for executing the method, which apparatus scans a document in response to a scanning request of the document via a network.

2. Description of the Related Art

In many cases, a document on a paper (hereinafter referred to as a paper document) has been stored as an electronic document corresponding to progress of advancing information technology. When the electronic document is stored in a database, the document can be easily searched for. With this, the handling of the document can be easy. In addition, a paperless office can be realized and space for storing the paper documents can be reduced and also the printing expenditure can be reduced.

When a paper document is computerized, various scanning conditions are required. For example, when a document is scanned with high resolution, a fine image document can be obtained. In addition, when a color scanning system is used, colors in the paper document can be computerized. However, when a paper document is scanned by using the color scanning system or with the high resolution, the size of the electronic document may be increased and the capacity of a recording medium such as a hard disk where the electronic paper is stored must be large. Therefore, it is desirable that the scanning conditions be suitably selected based on a classification of the paper document.

However, when the scanning conditions are selected by each user, different scanning conditions are used among users and consistency of the scanning conditions cannot be obtained in the office. Therefore, for example, in the office, it is desirable that the scanning conditions be determined in the office corresponding to the classification of the paper document, and a user in the office be required to scan a paper document based on the determined scanning conditions.

[Patent Document 1] Japanese Laid-Open Patent Application No. 2004-265140

[Patent Document 2] Japanese Laid-Open Patent Application No. 2004-310463

In Patent Document 1, a computerized document management system is disclosed. In the system, mixing a paper document with an electronic document can be realized in an examination and approval flow by adding unique ID information to the paper document which information can be read by a scanner.

In Patent Document 2, a document storing system is disclosed. In the system, in order to guarantee the originality of an electronic document, an electronic watermark is added to the electronic document when the electronic document is formed by scanning a paper document to be stored.

However, the scanning conditions are input by a user on an operating panel of a scanner. Therefore, even if the scanning conditions are stipulated in the office, executing the scanning conditions depends on the user. That is, a document may be scanned under conditions different from the stipulated scanning conditions due to a lack of understanding the scanning conditions or an operational error of the scanner.

SUMMARY OF THE INVENTION

In a preferred embodiment of the present invention, there is provided a document computerizing apparatus, a method thereof, and a program product for executing the method, in which a paper document can be scanned under suitable scanning conditions.

Features and advantages of the present invention are set forth in the description that follows, and in part will become apparent from the description and the accompanying drawings, or may be learned by practice of the invention according to the teachings provided in the description. Features and advantages of the present invention will be realized and attained by a document computerizing apparatus, a method thereof, and a program product for executing the method particularly pointed out in the specification in such full, clear, concise, and exact terms as to enable a person having ordinary skill in the art to practice the invention.

To achieve one or more of these and other advantages, according to one aspect of the present invention, there is provided a document computerizing apparatus which scans a document. The document computerizing apparatus includes a scanning condition managing unit for managing plural scanning conditions to be applied to the document based on a category of the document, a scanning request obtaining unit for obtaining a scanning request for the document via a network, a document category determining unit for determining the category of the document which document is an object of the scanning request, and a scanning condition determining unit for determining a scanning condition which is to be applied to the document, which is the object of the scanning request, on the basis of the category determined by the document category determining unit and the scanning conditions managed by the scanning condition managing unit. The document is scanned based on the scanning condition determined by the scanning condition determining unit.

According to another aspect of the present invention, there is provided a document computerizing apparatus which scans a document. The document computerizing apparatus includes a scanning request obtaining unit for obtaining a scanning request for the document via a network, and a scanning condition obtaining unit for obtaining a scanning condition to be applied to the document which document is an object of the scanning request. The document is scanned based on the scanning condition obtained by the scanning condition obtaining unit.

According to another aspect of the present invention, there is provided a document computerizing method for realizing the above document computerizing apparatus.

According to another aspect of the present invention, there is provided a program product for realizing the above document computerizing method.

Effect of the Invention

According to an embodiment of the present invention, there is provided a document computerizing apparatus, a method thereof, and a program product for executing the method, in which a paper document can be scanned under suitable scanning conditions.

BRIEF DESCRIPTION OF THE DRAWINGS

Features and advantages of the present invention will become more apparent from the following detailed description when read in conjunction with the accompanying drawings, in which:

FIG. 4 is a first sequence chart showing processes to execute a scanning job in the scanning system according to the first embodiment of the present invention;

FIG. 5 is a second sequence chart showing processes to execute the scanning job in the scanning system according to the first embodiment of the present invention;

FIG. 6 is a request message for executing the scanning job according to the first embodiment of the present invention;

FIG. 7 is a definition example of category information according to the first embodiment of the present invention;

FIG. 12 is a request message for executing the scanning job according to the second embodiment of the present invention;

FIG. 24 is a first example of a request message for executing the scanning job according to the fourth embodiment of the present invention;

FIG. 25 is a definition example of category information according to the fourth embodiment of the present invention;

FIG. 26 is a first example of a scanning condition setting screen on the operating panel according to the fourth embodiment of the present invention;

FIG. 27 is a second example of a request message for executing the scanning job according to the fourth embodiment of the present invention;

FIG. 29 is a third example of a request message for executing the scanning job according to the fourth embodiment of the present invention;

FIG. 31 is a definition example of category information according to the fifth embodiment of the present invention;

FIG. 32 is a request message for executing a scanning job according to the fifth embodiment of the present invention;

FIG. 33 is a scanning condition setting screen on the operating panel according to the fifth embodiment of the present invention.

DESCRIPTION OF THE PREFERRED EMBODIMENTS

Best Mode of Carrying Out the Invention

The best mode of carrying out the present invention is described with reference to the accompanying drawings.

Figure 1:
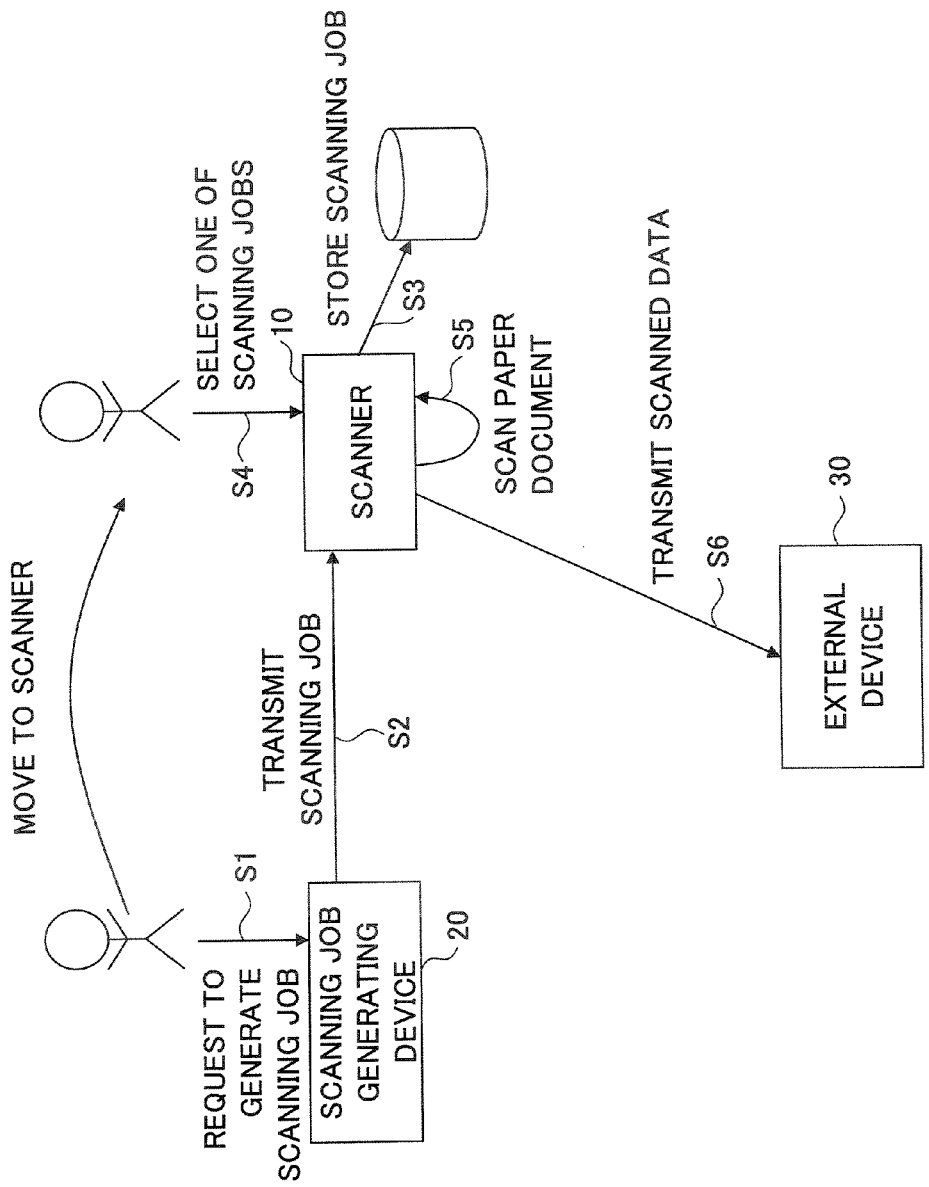
FIG. 1 is a diagram showing a scanning system in a document computerizing apparatus according to a first embodiment of the present invention.

FIG. 1 is a diagram showing a scanning system in a document computerizing apparatus according to a first embodiment of the present invention. As shown in FIG. 1, a scanning system 1 includes a scanner 10, a scanning job generating device 20, and an external device 30. The scanner 10, the scanning job generating device 20, and the external device 30 are connected via a network such as a LAN (local area network) and the Internet. As the network, a wired network and a wireless network can be used.

The scanning job generating device 20 generates a scanning job for the scanner 10 based on an input (scanning request) of a user and transmits the generated scanning job to the scanner 10. The scanning job generating device 20 can be a PC (personal computer) or a device formed of plural computers.

The scanner 10 scans a paper document based on the scanning job transmitted from the scanning job generating device 20.

Image data formed by scanning the paper document at the scanner 10 are transmitted to the external device 30. For example, the external device 30 is a database where the image data are stored or an operating device which utilizes the image data.

Referring to FIG. 1, processes in the scanning system 1 are described in detail.

When a user requests the scanning job generating device 20 to generate a scanning job (scanning request for executing the scanning job) (S1), the scanning job generating device 20 generates the scanning job and transmits the generated scanning job to the scanner 10 (S2).

The scanner 10 temporarily stores the received scanning job (S3). The user who input the scanning request or another user selects one of the scanning jobs stored in the scanner 10 by operating the operating panel of the scanner 10. Further, the user or another user sets a paper document on the scanner 10 and instructs the scanner 10 to scan the paper document (S4). The scanner 10 scans the paper document under the scanning conditions corresponding to the scanning job (S5). The scanning conditions are parameters set for scanning and include color or monochrome scanning, resolution, density conditions, and so on. After this, the scanner 10 transmits image data (scanned data) formed of the scanned paper document to the external device 30.

In addition, in the scanning system 1, the scanning job generating device 20 can automatically generate a scanning job based on a system stored in the scanning job generating device 20. For example, in the system, scanning of a paper document by the scanner 10 is preset. In this case, when scanning is requested by a user, a scanning job is automatically generated and the scanning job is transmitted to the scanner 10.

Further, the scanning job generating device 20 can be the external device 30. In this case, the scanner 10 transmits the scanned data to a source device which transmits the scanning job, that is, to the scanning job generating device 20. That is, the scanning job generating device 20 transmits the scanning job to the scanner 10 and waits for the scanned data from the scanner 10. When the scanning job generating device 20 receives the scanned data, a necessary process is applied to the scanned data.

Figure 2:
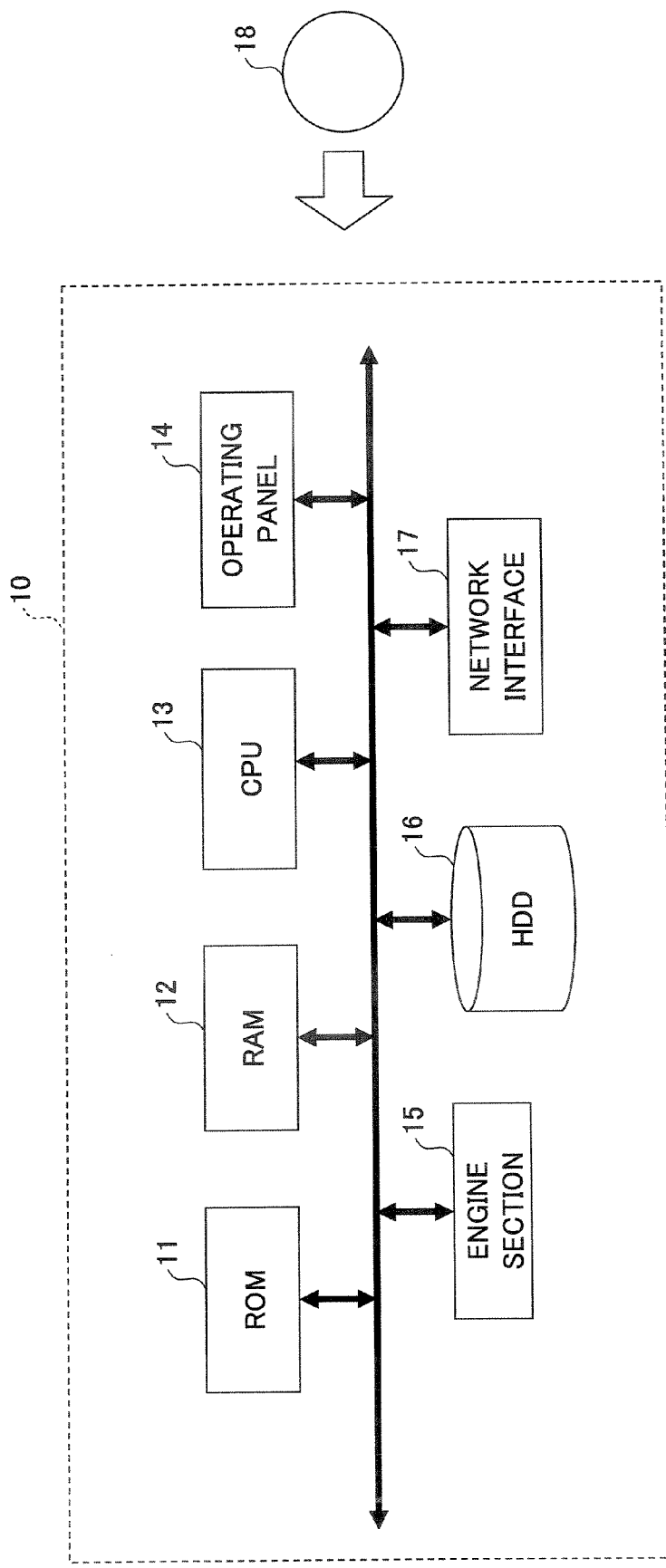
FIG. 2 is a diagram showing hardware of a scanner shown in FIG. 1.

Next, referring to FIG. 2, the scanner 10 is described in detail. FIG. 2 is a diagram showing hardware of the scanner 10 shown in FIG. 1. As shown in FIG. 2, the scanner 10 includes a ROM 11, a RAM 12, a CPU 13, an operating panel 14, an engine section 15, an HDD (hard disk drive) 16, and a network interface 17, all mutually connected by a bus.

The ROM 11 stores various programs which are executed in the scanner 10 and data which are needed for the programs. The RAM 12 stores data when a program is executed. The CPU 13 controls functions of the scanner 10 based on the programs stored in the ROM 11. A user inputs an instruction on the operating panel 14 and information is displayed on the operating panel 14 for the user. The engine section 15 reads image data of a paper document. The read image data are stored in the HDD 16 and the scanning job from the scanning job generating device 20 is also stored in the HDD 16. The network interface 17 connects the scanner 10 to the scanning job generating device 10 and the external device 30 via the network. In this, the programs which are executed by the CPU 13 can be stored in an external recording medium 18 such as a CD-ROM and can be loaded in the RAM 12 when the programs are executed.

Figure 3:
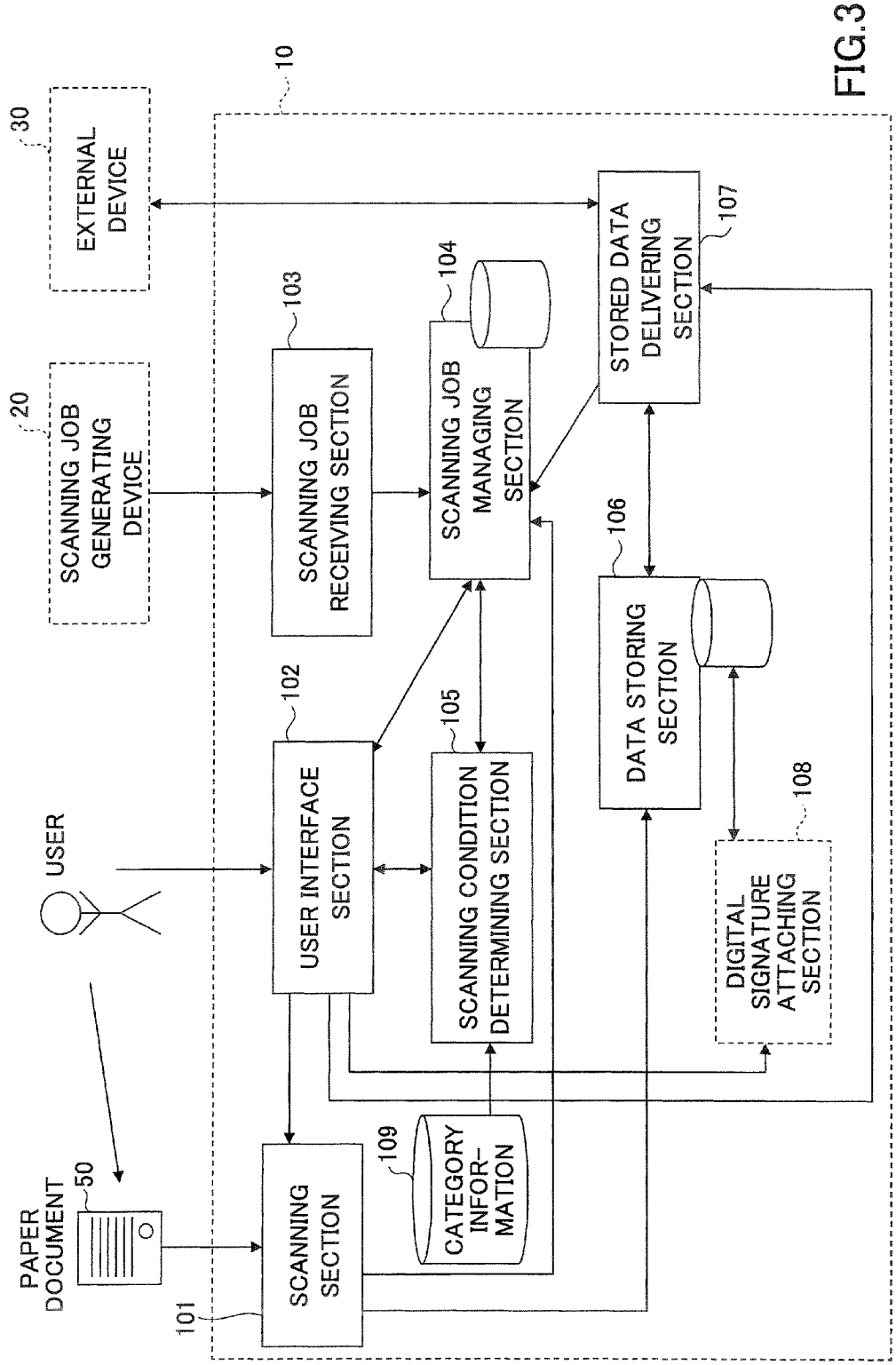
FIG. 3 is a functional diagram of the scanner shown in FIG. 1.

FIG. 3 is a functional diagram of the scanner 10 shown in FIG. 1. As shown in FIG. 3, the scanner 10 includes a scanning section 101, a user interface section 102, a scanning job receiving section 103, a scanning job managing section 104, a scanning condition determining section 105, a data storing section 106, a stored data delivering section 107, and a digital signature attaching section 108.

The scanning section 101 computerizes paper information (dark and light information) on a paper document 50. That is, the scanning section 101 optically reads the paper information, digitizes the paper information, and applies image format conversion to the digitized paper information. With this, the scanning section 101 generates image data of a predetermined format of JPEG, TIFF, or PDF, for example.

The user interface section 102 interprets an input by a user and controls the operating panel 14 to display information to be given to the user.

The scanning job receiving section 103 receives a scanning job transmitted from the scanning job generating device 20. In the first embodiment, the scanning job at least includes information which recognizes a category of the paper document 50 (hereinafter referred to as a document category) to be scanned. As the document category, there are a receipt, a bill, an invoice, and so on.

The scanning job managing section 104 temporarily stores the scanning job received by the scanning job receiving section 103 and manages access to the stored scanning job.

The scanning condition determining section 105 determines a default value and an acceptable value of the scanning conditions based on category information 109 when the scanning job is executed which job is selected by the user. In the category information 109, the default value and the acceptable value of the scanning conditions to be applied to the paper document 50 are defined corresponding to the document category. The category information 109 is stored in, for example, the HDD 16. That is, in the first embodiment of the present invention, when the scanning job generating device 20 generates the scanning job, the document category is set in the scanning job instead of the scanning conditions. The scanning conditions which are actually applied to at the scanning are determined by the scanning condition determining section 105.

The data storing section 106 stores the image data generated by the scanning section 101. The stored data delivering section 107 delivers the image data stored in the data storing section 106 to a predetermined destination, for example, the external device 30. Methods of delivering the stored data include file transfer and mail transfer via a network. The digital signature attaching section 108 attaches a digital signature to the image data for authenticating the image data stored in the data storing section 106.

Next, referring to the drawings, processes in the scanning system 1 are described. FIG. 4 is a first sequence chart showing processes to execute the scanning job in the scanning system 1 according to the first embodiment of the present invention. FIG. 5 is a second sequence chart showing processes to execute the scanning job in the scanning system 1 according to the first embodiment of the present invention.

First, a user instructs the scanning job generating device 20 to generate a scanning job (S101). At the time of the instruction, at least a document category is designated. The scanning job generating device 20 generates the scanning job based on the instruction of the user and transmits a request message including the document category for executing the scanning job to the scanner 10 (S102).

FIG. 6 is the request message for executing the scanning job according to the first embodiment of the present invention. In FIG. 6, a SOAP (simple object access protocol) message in an XML (extensible markup language) format is shown. However, the format is not limited to the above.

In a request message r101 shown in FIG. 6, a description r101-10 sandwiched between <SOAP-ENV:Body> tags shows job information of the scanning job.

A ScanIdentifier element r101-1 sandwiched between <ScanIdentifier> tags shows a job ID for identifying the scanning job. A JobDescription element r101-2 sandwiched between <JobDescription> tags shows information for identifying the scanning job. That is, the JobDescription element r101-2 includes a JobName element r101-21 and a JobOriginatingUserName element r101-22 as sub-elements. The JobName element r101-21 shows the job name and the JobOriginatingUserName element r101-22 shows the user name who inputs (originates) the job. A UserAuthentication element r101-23 shows the necessity of user authentication, and "required" shows that the user authentication is necessary.

In addition, a DestinationURL element r101-3 shows a destination URL (for example, the URL of the external device 30) where a file containing the scanned data is stored. In a DocumentParameters element r101-4, information for identifying the scanning conditions is defined. In the first embodiment of the present invention, a DocumentCategory element r101-41 is defined. The DocumentCategory element r101-41 shows a document category of the paper document 50. In FIG. 6, "Invoice" is defined as the document category.

In addition, a DocumentName element r101-5 shows a file name when the scanned data are stored in the HDD 16 of the scanner 10. In FIG. 6, the scanned data are stored with a name of "Scan12345679. tif".

In addition, in a ScanParameterModification element r101-6, information is defined that restricts changing the scanning conditions (hereinafter referred to as condition change restricting information). That is, the ScanParameterModification element r101-6 includes a ParameterModification element r101-61 as the sub-element, and in a value of the ParameterModification element r101-61, a level is set that restricts a change of the scanning conditions. Hereinafter, the level is referred to as "condition change restricting level".

In this, a change of a scanning condition signifies that a user manually changes a scanning condition on the operating panel 14 of the scanner 10, when a scanning job is executed by the scanner 10. That is, in the first embodiment of the present invention, the scanning conditions to be applied are determined based on the document category set in the scanning job. However, in a case where a scanning condition determined by the scanner 10 can never be changed, the scanning system cannot have flexibility. Therefore, in the first embodiment of the present invention, the scanner 10 permits the change when permission for the change of the scanning condition is designated in the scanning job.

In the ParameterModification element r101-61, the permission of the change of the scanning condition is described. In the first embodiment of the present invention, the condition change restricting level is set in "Prohibited", "Restricted", or "Unrestricted". In "Prohibited", the change of the scanning condition is never permitted. In "Restricted", the change is permitted in a range within a permissible scanning condition (acceptable value). In "Unrestricted", the change is permitted in a range within performance of the scanner 10 over the range of the permissible scanning condition. In FIG. 6, "Restricted" is designated as the condition change restricting level. Therefore, the user can change the scanning condition within the permissible scanning condition.

Next, returning to FIG. 4, the scanning job receiving section 103 receives the request message r101 and requests the scanning job managing section 104 to store the scanning job r101-10 included in the request message r101 (S103). The scanning job managing section 104 stores the scanning job r101-10 in, for example, the HDD 16 (S104). When the scanning job receiving section 103 receives information that the scanning job r101-10 is stored (S105), the scanning job receiving section 103 returns a message to the scanning job generating device 20 in which message normal reception of the scanning job r101-10 is described (S106). The scanning job generating device 20 informs the user that the transmission of the scanning job r101-10 is completed based on a reply from the scanner 10.

The above processes S101 through S107 are sequentially executed corresponding to the generation of the scanning job. Therefore, plural scanning jobs are stored in the scanner 10.

Next, the user moves to the scanner 10. Therefore, processes from S108 on are asynchronously executed with the processes S101 through S107. In this, it is preferable that user authentication be executed by using biometrics or a password of the user before operating the scanner 10.

When the user designates to display a list of the scanning jobs (hereinafter referred to as a scanning job list) stored in, for example, the HDD 16 (S108), the user interface section 102 of the scanner 10 requests the scanning job managing section 104 to obtain the scanning job list (S109). The scanning job managing section 104 forms the scanning job list based on the stored contents in the HDD 16 (S110) and sends the scanning job list to the user interface section 102 (S11). The user interface section 102 displays the scanning job list on the operating panel 14 (S112).

When the user selects a scanning job to be executed from the scanning job list on the operating panel 14 (S113), the user interface section 102 queries the scanning condition determining section 105 about a scanning condition to be applied to the selected scanning job (hereinafter referred to as a selected job) (S114). The scanning condition determining section 105 requests the scanning job managing section 104 to obtain job information of the selected job (S115). In this, the job information corresponds to information of the scanning job r101-10 shown in FIG. 6. The scanning job managing section 104 obtains the job information of the selected job (S116), and sends the job information of the selected job to the scanning condition determining section 105 (S117). The scanning condition determining section 105 determines a default value and an acceptable value in the scanning conditions to be applied to the selected job based on the document category included in the job information and the category information 109 (S118).

FIG. 7 is a definition example of the category information 109 according to the first embodiment of the present invention. In FIG. 7, a definition example in an XML format is shown; however, the format of the category information 109 is not limited to the XML format.

In the document information 109 shown in FIG. 7, a DocumentCategory element 109-1 shows a document category to which the document category 109 is applied. In FIG. 7, category information applying to "Invoice" is shown; however, category information of other document categories can be defined by a format similar to the format shown in FIG. 7.

In a DocumentParameters element 109-2, scanning conditions to be applied to the document category "Invoice" are set. The DocumentParameters element 109-2 includes a DocumentFormat element 109-21, a DocumentSizeAutoDetect element 109-22, a ColorEncoding element 109-23, a ColorPlanes element 109-24, a ColorBitsPerPlane element 109-25, and a Resolution element 109-26; and these elements are sub elements or sub-sub elements of the DocumentParameters element 109-2. In each of the above elements, "pdf" is set as a default value of a storing format of a scanning image, "true" is set to automatically detect the paper size of the paper document 50 to be scanned, "Grayscale" is set as a default value of an image type of the scanning image, "1" is set as a default value of the number of color planes, "8" is set as a default value of the bit number per plane, and "100" is set as a default value of resolution.

In the above elements, some elements have an AllowedValues attribute. The AllowedValues attribute has set an acceptable value of the scanning condition. For example, the value of the AllowedValues attribute of the DocumentFormat element 109-21 is "extif jfif tiff-multi pdf". This shows that formats described in the above exist other than "pdf" as the storing format of the scanning data to be allowed. In addition, the value of the AllowedValues attribute of the DocumentSizeAutoDetect element 109-22 is "true false". This shows that automatic detecting of the paper size is possible. The value of the AllowedValues attribute of the ColorEncoding element 109-23 is "Binary Grayscale Color". This shows that "Binary", "Grayscale", or "Color" can be set as the image type of the scanning image. In addition, the value of the AllowedValues attribute of the Resolution element 109-26 is "100 150 200 300". This shows that 100, 150, 200, or 300 dpi can be set as the writing resolution of the scanning image.

The category information 109 shown in FIG. 7 can be defined in each document category, that is, other than "Invoice". Therefore, the scanning condition determining section 105 searches for the category information 109 corresponding to the document category based on the document category set in the selected job and determines that the default value and the acceptable value of the scanning conditions defined in the searched document category as the default value and the acceptable value of the scanning conditions to be applied to the selected job. Further, the scanning condition determining section 105 obtains the condition change restricting level from the ParameterModification element r101-61 defined in the job information of the selected job.

Next, returning to FIG. 4, the scanning condition determining section 105 answers the user interface section 102 with the determined result of the scanning conditions (the default value and the acceptable value), and the condition change restricting level (S119).

The user interface section 102 displays a scanning condition setting screen on the operating panel 14 based on the determined result of the scanning conditions by the scanning condition determining section 105 (S120). In this, the scanning condition setting screen is displayed in a manner where the default value is selected and the scanning conditions can be changed corresponding to the acceptable value in the scanning conditions and the condition change restricting level.

That is, when the condition change restricting level is "Prohibited", the scanning conditions cannot be changed so as to maintain the default value. When the condition change restricting level is "Restricted", the scanning conditions can be changed within the acceptable value. Further, when the condition change restricting level is "Unrestricted", the scanning conditions can be changed within the performance of the scanner 10 regardless of the acceptable value. Therefore, based on the request message r111 shown in FIG. 6 and the category information 109 shown in FIG. 7, the scanning condition setting screen can be shown in FIG. 8.

Figure 8:
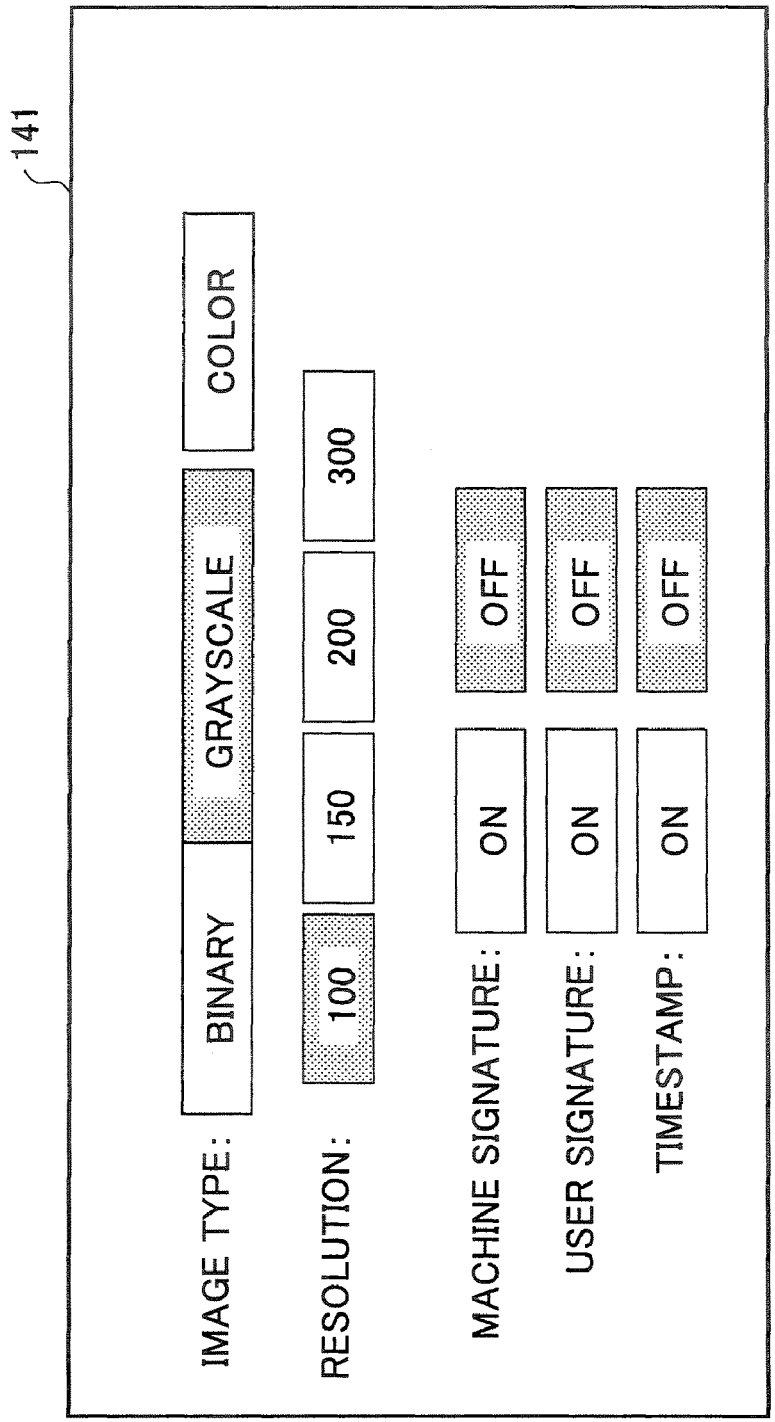
FIG. 8 is a scanning condition setting screen on an operating panel according to the first embodiment of the present invention.

FIG. 8 is a scanning condition setting screen on the operating panel 14 according to the first embodiment of the present invention. In FIG. 8, buttons which can be selected are shown, and selected buttons are shown with a mesh pattern.

In a scanning condition setting screen 141 shown in FIG. 8, the category information 109 shown in FIG. 7 is applied to the scanning job in which the document category is "Invoice" and the condition change restricting level is "Restricted". Therefore, as the image type, a button of "GRAYSCALE" is selected, and buttons of "BINARY" and "COLOR" are displayed as candidates to be selected. As the resolution, a button of "100" is selected, and buttons of "150", "200", and "300" are displayed as candidates to be selected. In this, the button "100" of the resolution is 100 dpi, and the others buttons are the same as that of the button "100". In FIG. 8, all items in the scanning conditions set in the category information 109 shown in FIG. 7 are not displayed. However, an example is shown in FIG. 8, and any item can be selected depending on the necessity. In addition, a machine signature, a user signature, and a timestamp shown in FIG. 8 are described below.

Next, returning to FIG. 4, the user changes the scanning conditions on the scanning condition setting screen 141, if necessary (S121), and pushes a scanning start button (not shown) on the operating panel 14 by setting the paper document 50 on the scanner 10 (S122). The user interface section 102 instructs the scanning section 101 to scan the paper document 50 based on the determined result (scanning conditions) by the scanning condition determining section 105 on the scanning condition setting screen 141 (S123).

The scanning section 101 scans an image on the paper document 50 by controlling the engine section 15, and requests the data storing section 106 to store the scanned data (S124). The data storing section 106 stores the scanned data in, for example, the HDD 16 (S125). Then, the data storing section 106 informs the scanning section 101 of the stored result (S126). The scanning section 101 informs the user interface section 102 of the stored result of the scanned data (S127).

Next, referring to FIG. 5, processes from S128 on are described. When the scanned data are normally stored, the user interface section 102 requests the stored data delivering section 107 to deliver the stored data (S128). As the destination, a value set in the DestinationURL element of the category information 109 shown in FIG. 7 is designated. The stored data delivering section 107 requests the data storing section 106 to send the scanned data to be delivered (hereinafter referred to as delivery data) (S129). The data storing section 106 obtains the delivery data from the HDD 16 (S130) and sends the delivery data to the stored data delivering section 107 (S131). The stored data delivering section 107 delivers the delivery data to the destination, for example, the external device 30 (S132). The delivery data can be delivered to the destination by using file transfer or mail transfer via a network. In addition, the delivery data can be delivered to the external device 30 by file transfer corresponding to a periodic request from the external device 30.

The stored data delivering section 107 recognizes the delivered result by receiving a delivery completion notice from the destination (the external device 30) (S133), and informs the scanning job managing section 104 of the delivered result (S134).

The scanning job managing section 104 changes the status of the selected job to, for example, "Completion" (S135), and informs the stored data delivering section 107 of the changed result (S136). When the change of the status is normally executed, the stored data delivering section 107 deletes the delivery data (S137), and informs the user interface section 102 of the delivery result (S138). The user interface section 102 informs the user of the completion of the delivery by making the operating panel 14 display the delivery result.

As described above, in the scanning system 1 according to the first embodiment of the present invention, scanning the image on the paper document 50 can be executed under the scanning conditions set in the category information 109. Therefore, in a case where a rule for storing an electronic document (digital document) is stipulated in an organization, when contents in compliance with the rule are defined in the category information 109, scanning an image under a scanning condition violating the rule can be effectively prevented when such violations are caused by not understanding the rule or an operating error by the user.

In addition, the scanning system 1 according to the first embodiment of the present invention is an effective system under the electronic document law enforced on Apr. 1, 2005, in Japan. In the electronic document law, an electronic document can be admitted as an original document, but the document must be scanned under scanning conditions in compliance with the law. When the scanning conditions in compliance with the law are defined in the category information 109 in each document category, scanning an image suitable to the scanning conditions in compliance with the law can be executed.

In addition, in the scanning system 1 according to the first embodiment of the present invention, an acceptable value is determined in the scanning conditions and the user can change the scanning conditions when the scanning is executed. Therefore, the user can flexibly change the scanning conditions based on the status of the paper document 50. For example, when image quality of the paper document 50 is poor, the user can make the resolution higher than the default value. In this, the acceptable value is determined within the rule in the organization and the law (for a document to be admitted as an original). For example, when an image must be scanned at 300 dpi or more resolution in the law, the acceptable value is set to be 300 dpi or more. With this, scanning a document in violation of the rule and against the law can be prevented.

Next, referring to the drawings, a second embodiment of the present invention is described.

In the first embodiment of the present invention, the scanner 10 determines the scanning conditions based on the document category designated by the scanning job. However, there is a case where the scanning conditions applying to each document category is different among systems or organizations that request scanning a document on the scanner 10, or there is a case where defining the scanning conditions in each document category is not suitable for operations. Therefore, in the second embodiment of the present invention, the scanning conditions can be set within the scanning job. In the second embodiment of the present invention, a scanning system is basically the same as the scanning system 1 shown in FIG. 1. Therefore, the same description is omitted. However, in the second embodiment of the present invention, a scanner 10a is used instead of the scanner 10 in the first embodiment.

Figure 9:
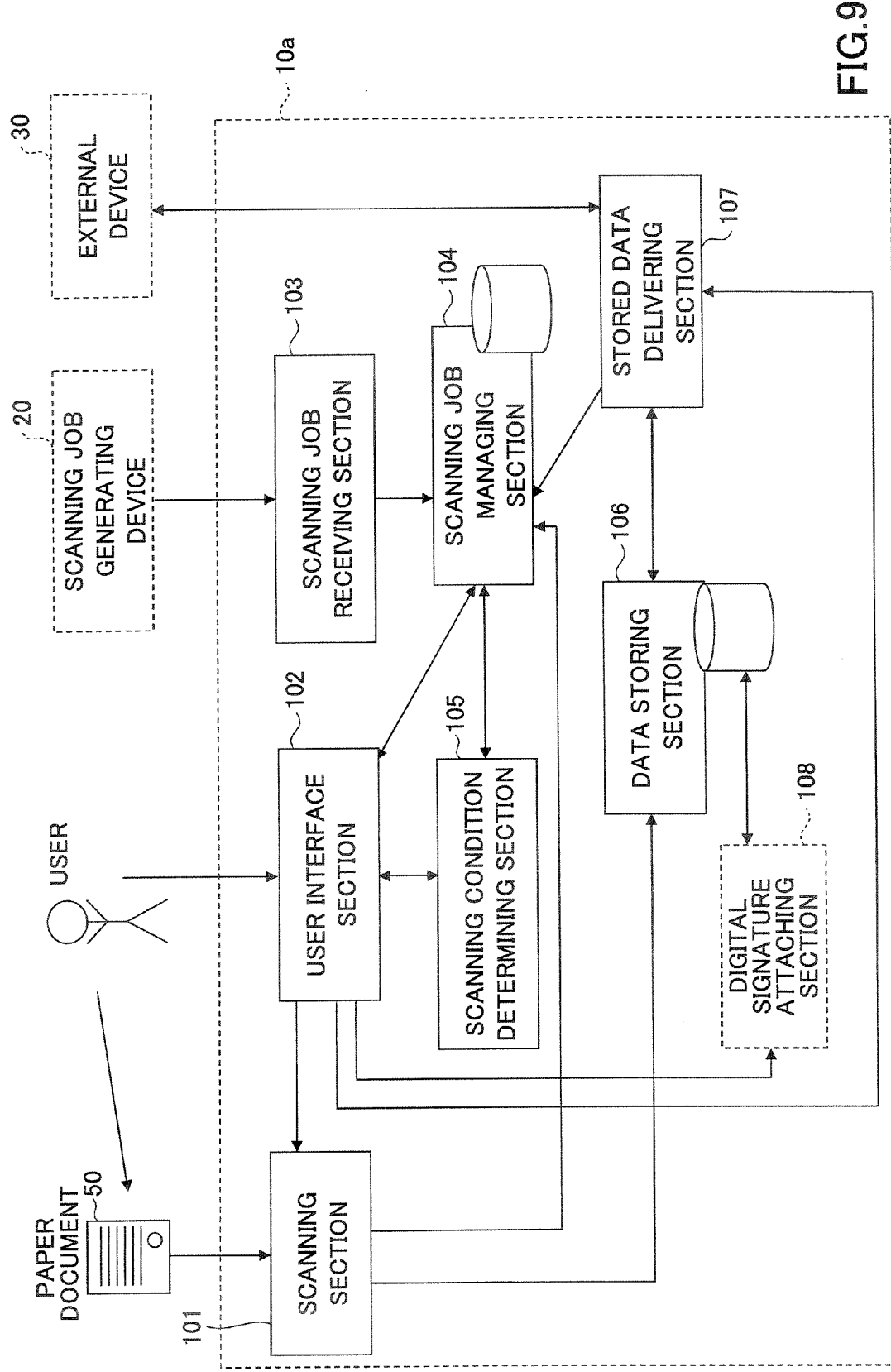
FIG. 9 is a functional diagram of a scanner according to a second embodiment of the present invention.

FIG. 9 is a functional diagram of the scanner 10a according to the second embodiment of the present invention. In FIG. 9, a same function as that shown in FIG. 3 has the same reference number. Therefore, the same description is omitted.

As shown in FIG. 9, the scanner 10a does not include the category information 109 which the scanner 10 of the first embodiment includes. Since the scanning conditions are set in the scanning job, the category information 109 is not needed.

Figure 10:
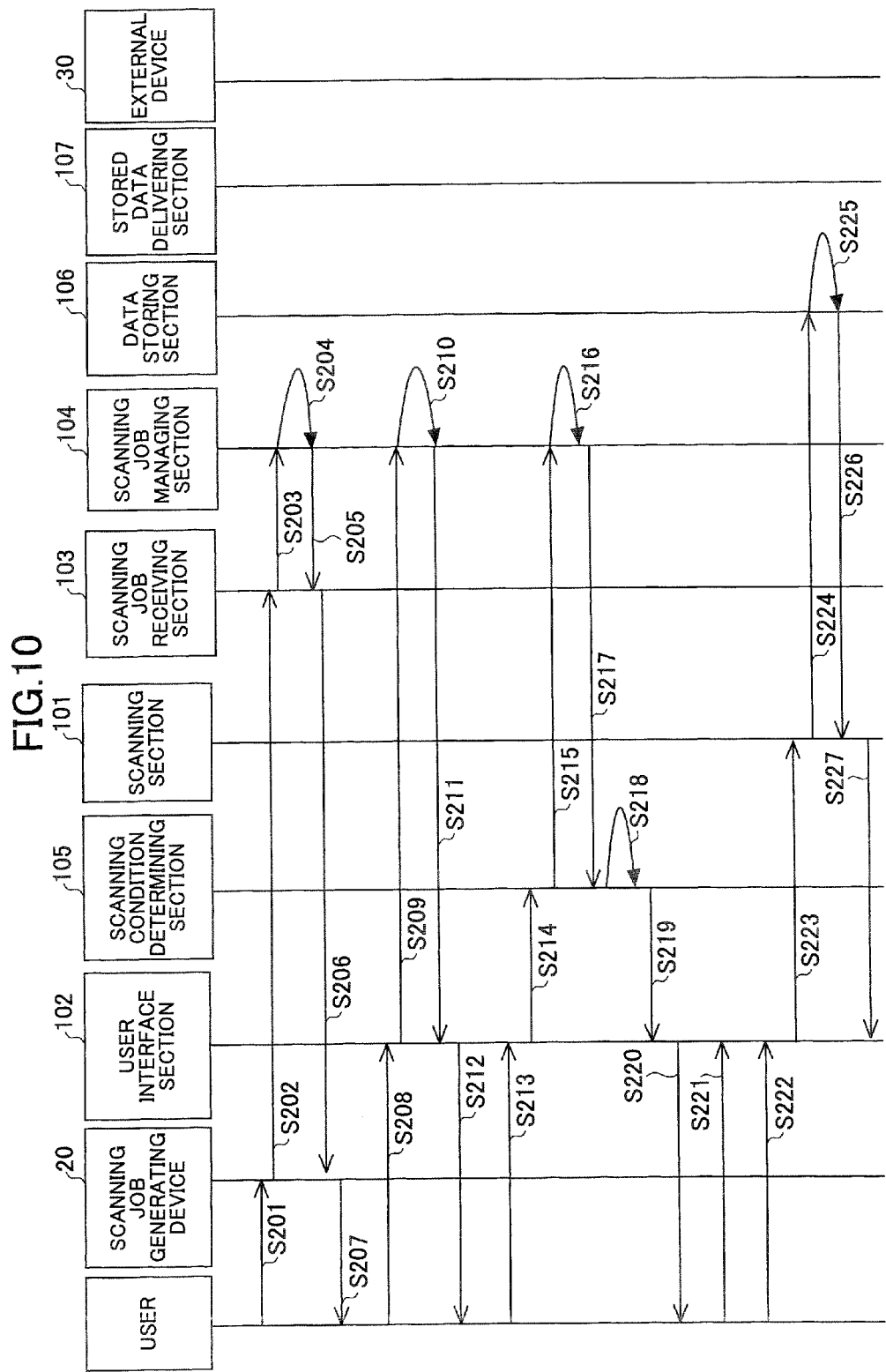
FIG. 10 is a first sequence chart showing processes to execute the scanning job in the scanning system according to the second embodiment of the present invention.
Figure 11:
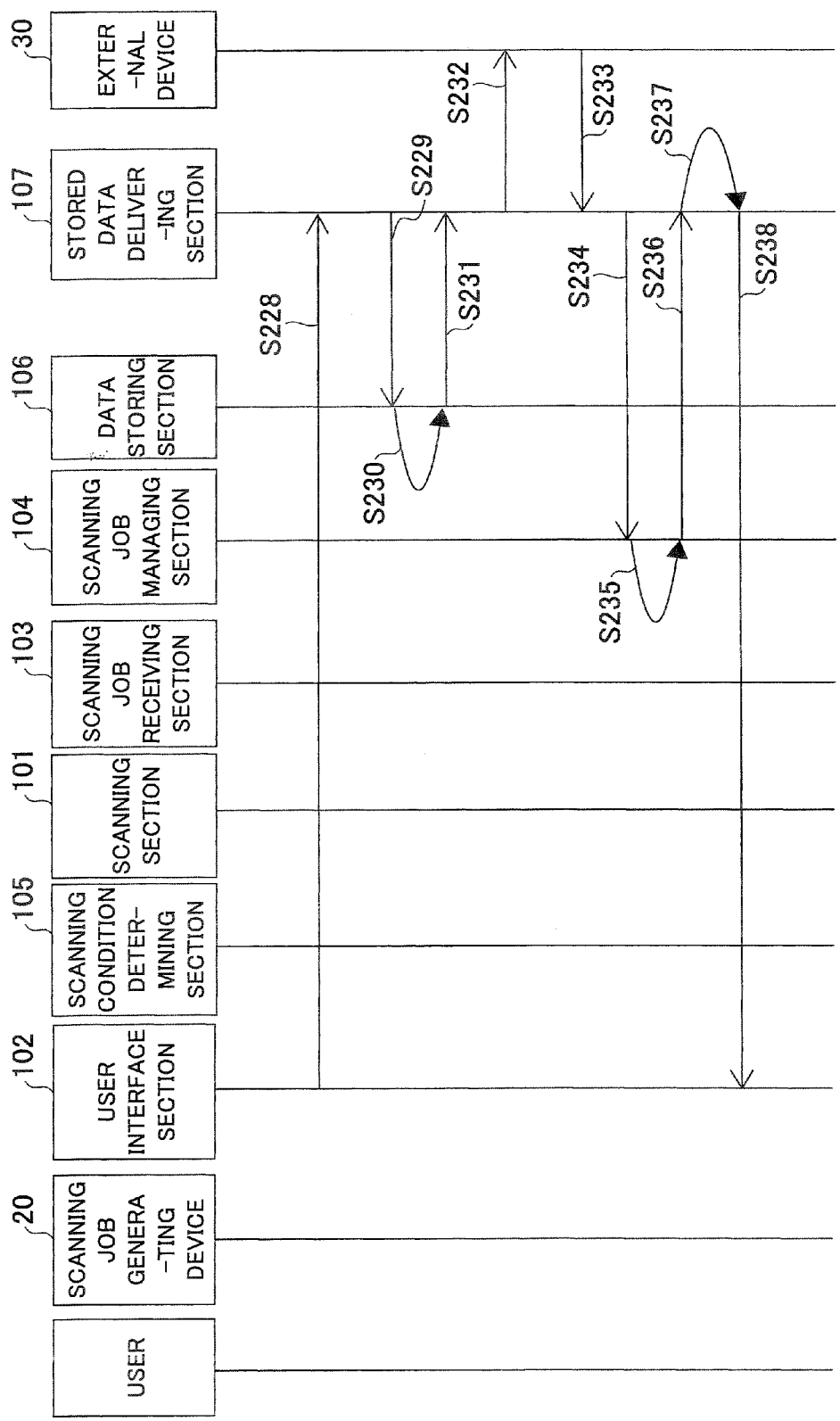
FIG. 11 is a second sequence chart showing processes to execute the scanning job in the scanning system according to the second embodiment of the present invention.

Next, referring to the drawings, processes in the scanning system 1 according to the second embodiment of the present invention are described. FIG. 10 is a first sequence chart showing processes to execute the scanning job in the scanning system 1 according to the second embodiment of the present invention. FIG. 11 is a second sequence chart showing processes to execute the scanning job in the scanning system 1 according to the second embodiment of the present invention.

First, a user instructs the scanning job generating device 20 to generate a scanning job (S201). At the time of the instruction, the user sets a value of each item in the scanning conditions. The scanning job generating device 20 generates the scanning job including the scanning conditions set by the user and transmits a request message for requesting to execute the scanning job to the scanner 10a (S202).

FIG. 12 is the request message for executing the scanning job according to the second embodiment of the present invention.

In a request message r201 shown in FIG. 12, a description r201-10 sandwiched between <SOAP-ENV:Body> tags shows job information of the scanning job.

In a DocumentParameters element r201-4 of the job information r201-10, scanning conditions to be applied to the scanning job are directly set instead of in the document category. For example, the DocumentParameters element r201-4 includes a DocumentFormat element r201-41, a DocumentInputSize element r201-42, a DocumentInputSource element r201-43, a Resolution element r201-44, a ColorEncoding element r201-45, a ColorPlanes element r201-46, a ColorSpace element r201-47, and a ColorBitsPerPlane element r201-48; and these elements are sub elements or sub-sub elements of the DocumentParameters element r201-4. In each of the above elements, "tiff-multi" is set as a storing format of a scanning image, "A4" is set as an image size, "ADF" is set as an input source of the paper document 50, "200" is set as the resolution, "Color" is set as an image type of the scanning image, "3" is set as the number of color planes, and "8" is set as the bit number per plane.

In addition, in a ScanParameterModification element r201-5, similar to that in the first embodiment, condition change restricting information is defined. In the ScanParameterModification element r201-5 of the second embodiment, in addition to a ParameterModification element r201-51 in which the condition change restricting level is set, a ModifiableParameter element r201-52 is set as a sub-element.

The ModifiableParameter element r201-52 is defined when the value of the condition change restricting level is "Restricted". Sub elements corresponding to items whose change is restricted are written from items of which the scanning conditions are formed, and an acceptable value is set in the attribute of each element. For example, the ModifiableParameter element r201-52 includes a colorPlanes element r201-521, a ColorBitsPerPlane element r201-522, and a Resolution element r201-523 as sub elements. In each of the above elements, "3", "8", and "200" are set as a corresponding default value in this order. In addition, in the Min attribute, the minimum value or the lowest value of each item is set; in this case, "3", "8", and "200" are set in this order. That is, in the above items, a change below the minimum value is restricted. In FIG. 12, the maximum value is not shown; however, the maximum value can be restricted in a Max attribute. In addition, instead of using the minimum value or the maximum value, settable values can be used.

In this, when the value in the ParameterModification element r201-51 is "Restricted", the value of an item which is not shown in the ModifiableParameter element r201-52 is not restricted.

Other elements such as the ScanIdentifier element r201-1, the JobDescription element r201-2, the DestinationURL element r201-3, and the DocumentName element r201-6 are the same as the corresponding elements whose reference numbers are not the same as shown in FIG. 6.

Next, returning to FIG. 10, the processes from S203 on are described. Processes from S203 through S217 are the same as the processes from S103 through S117 in the first embodiment; therefore, the same descriptions are omitted.

The scanning condition determining section 105 determines a default value and an acceptable value in the scanning conditions to be applied to the selected job and the condition change restricting level based on the job information of the selected job (S218).

The scanning condition determining section 105 answers the user interface section 102 with the determined result of the scanning conditions (the default value and the acceptable value), and the condition change restricting level (S219).

The user interface section 102 displays a scanning condition setting screen on the operating panel 14 based on the determined result of the scanning conditions by the scanning condition determining section 105 (S220). In this, the scanning condition setting screen is displayed in a manner where the default value is selected and the scanning conditions can be changed corresponding to the acceptable value in the scanning conditions and the condition change restricting level.

That is, when the condition change restricting level is "Prohibited", the scanning conditions cannot be changed so as to maintain the default value. When the condition change restricting level is "Restricted", the scanning conditions can be changed within the acceptable value. Further, when the condition change restricting level is "Unrestricted", the scanning conditions can be changed within the performance of the scanner 10a regardless of the acceptable value.

Figure 13:
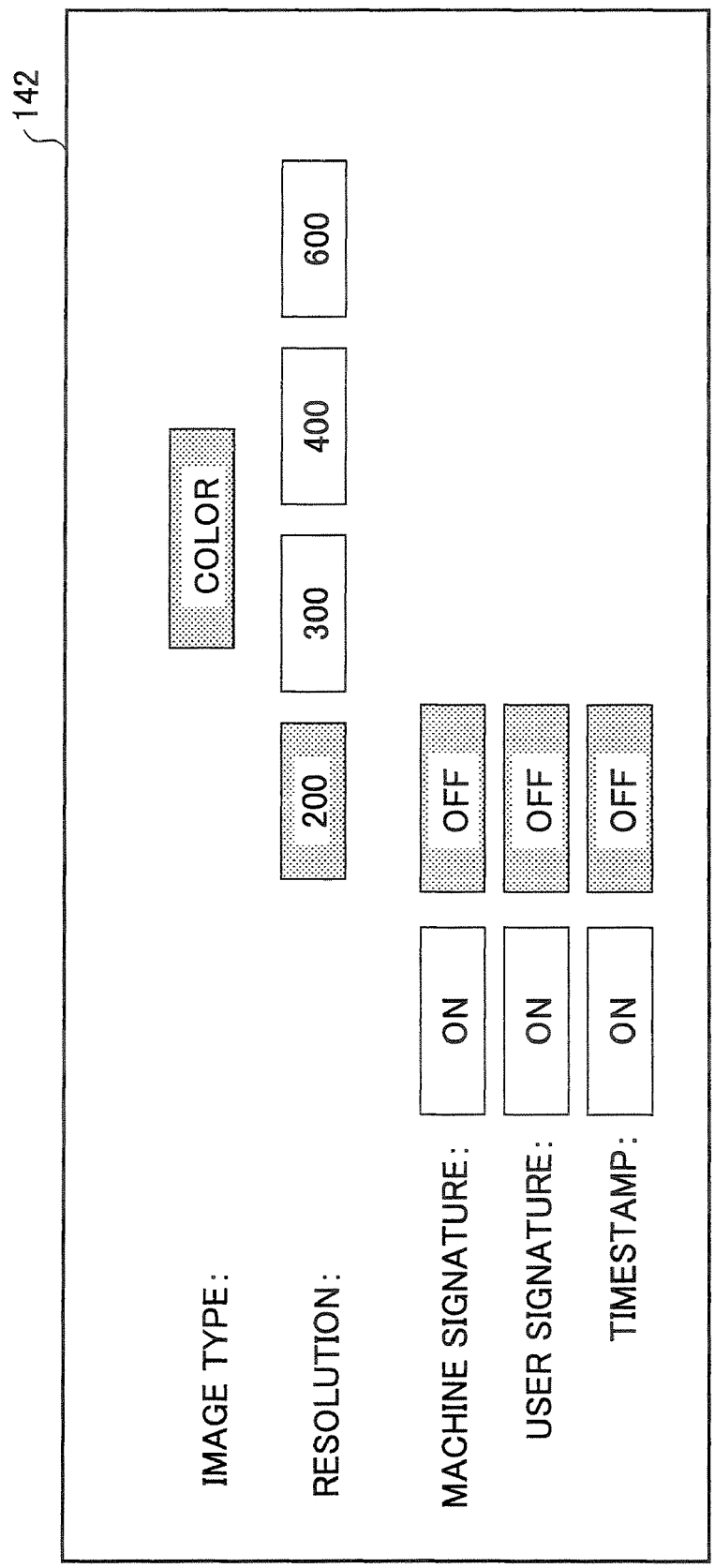
FIG. 13 is a first example of a scanning condition setting screen on the operating panel according to the second embodiment of the present invention.

Therefore, in the scanner 10a, when the image type corresponds to "Binary (1 bit for a pixel", "Grayscale (Monochrome, 8 bits for a pixel)", and "Color (8 bits for a pixel for each of RGB)", and the resolution corresponds to 100, 150, 200, 300, 400, and 600 dpi, the scanning condition setting screen is as shown in FIG. 13, based on the job information shown in FIG. 12.

FIG. 13 is a first example of a scanning condition setting screen on the operating panel 14 according to the second embodiment of the present invention. In FIG. 13, buttons which can be selected are shown, and selected buttons are shown with a mesh pattern.

In a scanning condition setting screen 142 shown in FIG. 13, as the image type, "COLOR" is selected based on the ColorEncoding element r201-45. As the resolution, "200" (dpi) is selected based on the Resolution element r201-44. In addition, as the condition change restricting information, the minimum value of the color plane number is "3" based on the ColorPlane element r201-521, and the minimum value of the bit number per plane is "8" based on the ColorBitsPerPlane element r201-522. Therefore, buttons other than "COLOR" in the image type are not displayed, and the change of the image type is restricted. In addition, since the minimum value of the resolution is 200 dpi based on the Resolution element r201-523, buttons less than 200 (dpi) are not displayed and the change to the resolution of less than 200 dpi is restricted.

In FIG. 13, all items in the scanning conditions set in the job information r201-10 shown in FIG. 12 are not displayed. However, an example is shown in FIG. 13, and any item can be selected depending on the necessity. In addition, a machine signature, a user signature, and a timestamp shown in FIG. 13 are described below.

Figure 14:
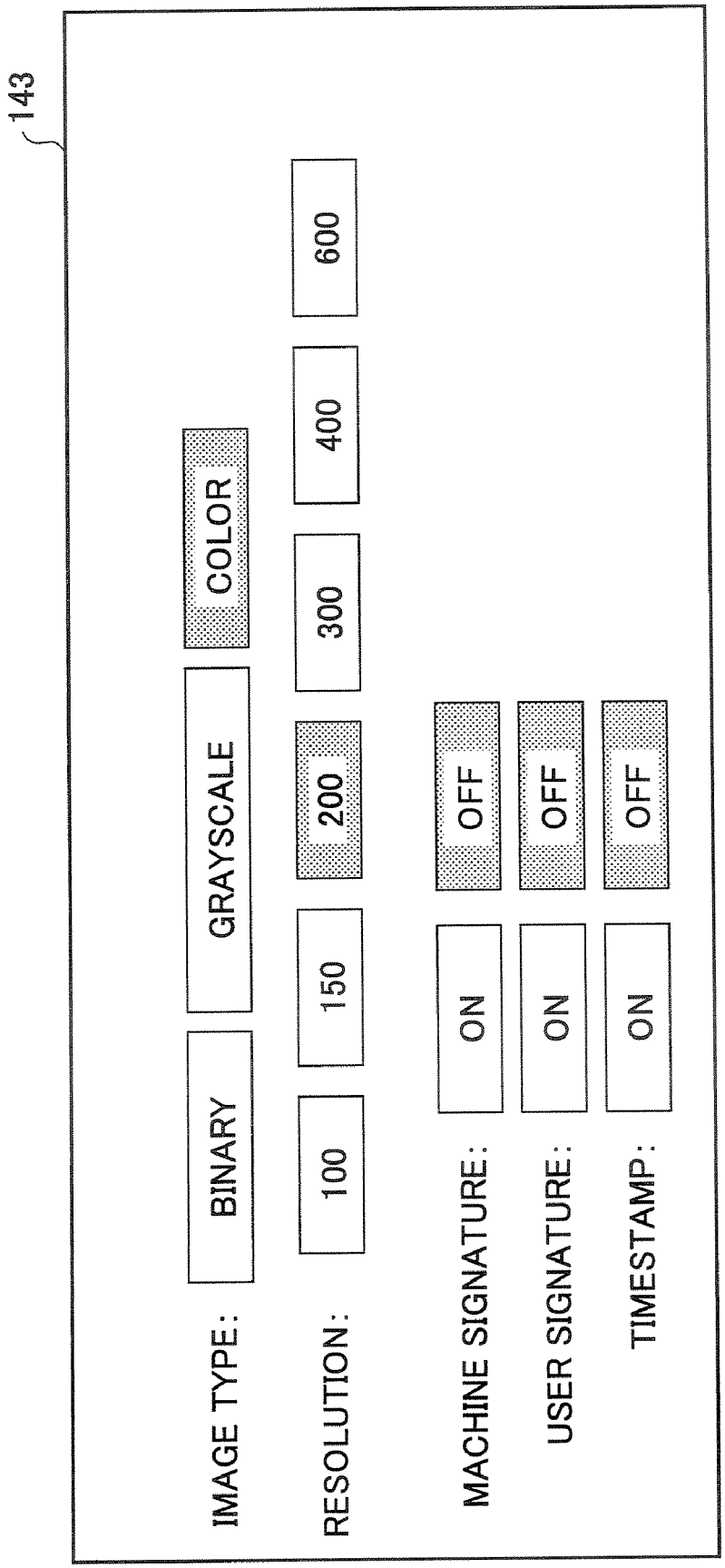
FIG. 14 is a second example of a scanning condition setting screen on the operating panel according to the second embodiment of the present invention.

When the condition change restricting information (the ScanParameterModification element r201-5) is not set in the job information r201-10, that is, when the change of the scanning conditions is not restricted, a scanning condition setting screen 143 shown in FIG. 14 is displayed.

FIG. 14 is a second example of a scanning condition setting screen on the operating panel 14 according to the second embodiment of the present invention.

In a scanning condition setting screen 143 shown in FIG. 14, in addition to the "COLOR" button, the "BINARY" button and the "GRAYSCALE" button are displayed; that is, the image type can be changed. In addition, in the resolution, 100 dpi or 150 dpi which are less than 200 dpi can be selected.

Figure 15:
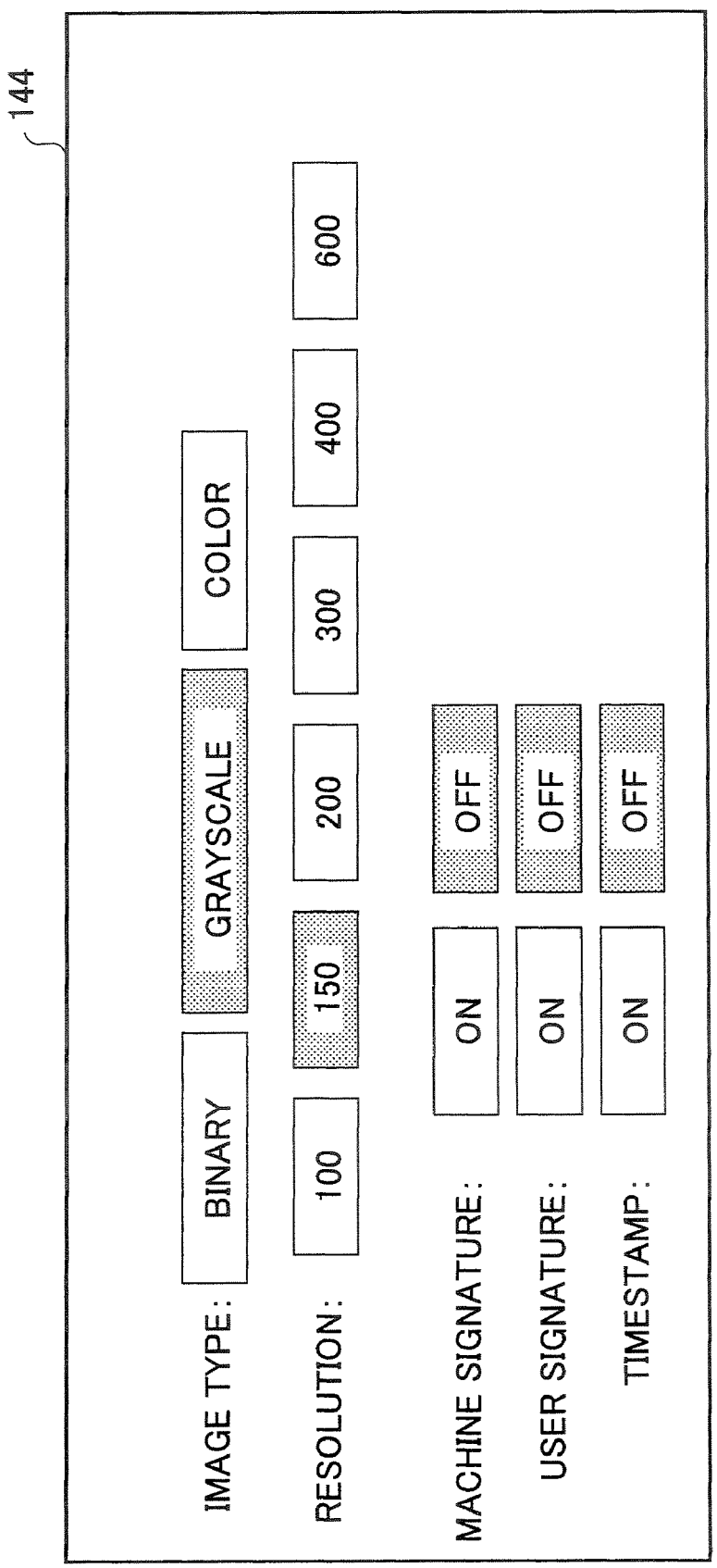
FIG. 15 is a third example of a scanning condition setting screen on the operating panel according to the second embodiment of the present invention.

Further, when the image type, the resolution, and so on are not set in the job information r201-10, that is, the Resolution element r201-44, the ColorEncoding element r201-45, the ColorPlanes element r201-46, the ColorSpace element r202-47, and the ColorBitsPerPlane element 201-48 are not set, a scanning condition setting screen 144 shown in FIG. 15 is displayed.

FIG. 15 is a third example of a scanning condition setting screen on the operating panel 14 according to the second embodiment of the present invention.

In a scanning condition setting screen 144 shown in FIG. 15, default values set in the scanner 10a are selected. In the example shown in FIG. 15, the default value of the image type is "GRAYSCALE" and the default value of the resolution is "150".

Next, returning to FIG. 10, processes from S221 on are described; however, the processes from S221 through S238 are the same as the processes from S121 through S138 in the first embodiment. Therefore, the same descriptions are omitted.

As described above, in the scanning system 1 according to the second embodiment of the present invention, the scanning conditions can be flexibly set without any restriction from the document category. In addition, the scanning conditions can be suitably changed when the scanner 10a is used. Therefore, when the scanning job generating device 20 generates a scanning job by setting scanning conditions in compliance with the rule in the organization and the law, scanning of a document violating the rule and against the law can be prevented.

Next, referring to the drawings, a third embodiment of the present invention is described.

Figure 16:
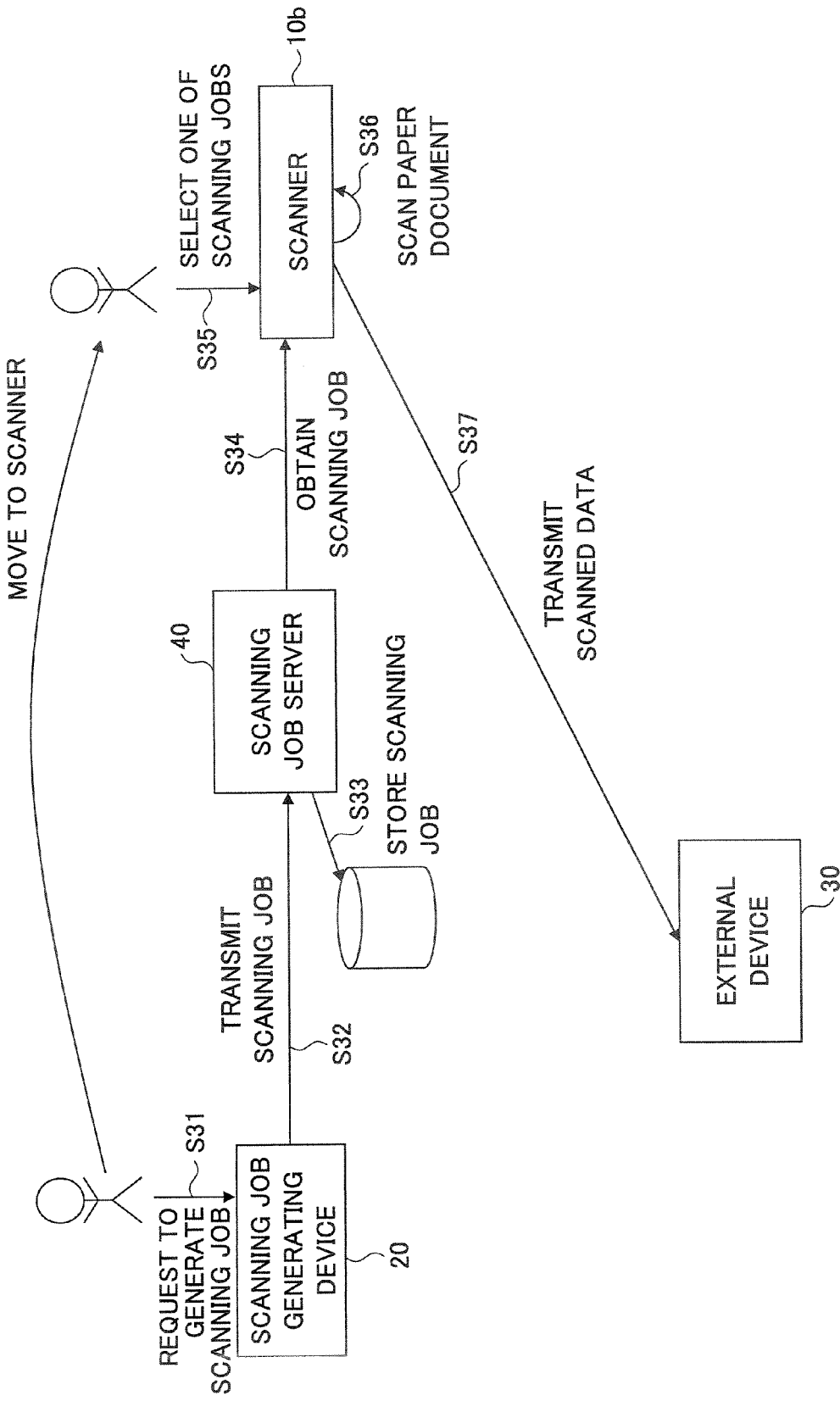
FIG. 16 is a diagram showing a scanning system in a document computerizing apparatus according to a third embodiment of the present invention.

FIG. 16 is a diagram showing a scanning system in a document computerizing apparatus according to a third embodiment of the present invention. In FIG. 16, a same element shown in FIG. 1 has the same reference number as that shown in FIG. 1, and the same description is omitted.

In a scanning system 2 shown in FIG. 16, a scanning job server 40 is newly added and a scanner 10b is different from the scanner 10 shown in FIG. 1. The scanning job server 40 receives a scanning job from the scanning job generating device 20 and temporarily stores the received scanning job. The scanning job server 40 transmits a list of the scanning jobs to the scanner 10b upon receipt of a request from the scanner 10b.

Next, referring to FIG. 16, processes in the scanning system 2 are described.

When a user instructs the scanning job generating device 20 to generate a scanning job (S31), the scanning job generating device 20 generates a scanning job and transmits the scanning job to the scanning job server 40 (S32). The scanning job server 40 temporarily stores the scanning job (S33).

The scanner 10b queries the scanning job server 40 of the presence of a scanning job. When a scanning job is stored in the scanning job server 40, the scanner 10b obtains the scanning job (S34). When plural scanning jobs are stored in the scanning job server 40, the scanner 10b obtains the list of the scanning jobs.

The user who instructed the scanning job generating device 20 to generate the scanning job or another user selects a scanning job to be executed from the scanning jobs obtained by the scanner 10b by operating the operating panel 14. Then the user instructs the scanner 10b to execute the scanning job by setting a document on the scanner 10b (S35). The scanner 10b scans the document based on scanning conditions corresponding to the scanning job (S36). The scanning conditions include parameters such as an image type (color or monochrome), resolution, and a density condition. The scanner 10b transmits scanned data (image data) to the external device 30 (S37).

As described above, in the scanning system 2 according to the third embodiment of the present invention, the scanner 10b actively obtains the scanning job, this is, the scanning system 2 is a PULL type. The above is different from the scanning system 1.

In the scanning system 2, similar to the scanning system 1, the scanning job generating device 20 can automatically generate a scanning job based on a system installed in the scanning job generating device 20.

In addition, similar to the scanning system 1, in the scanning system 2, the external device 30 and the scanning job generating device 20 can be one device.

In the third embodiment of the present invention, the hardware of the scanner 10*b* can be the same as that of the scanner 10 shown in FIG. 2.

Figure 17:
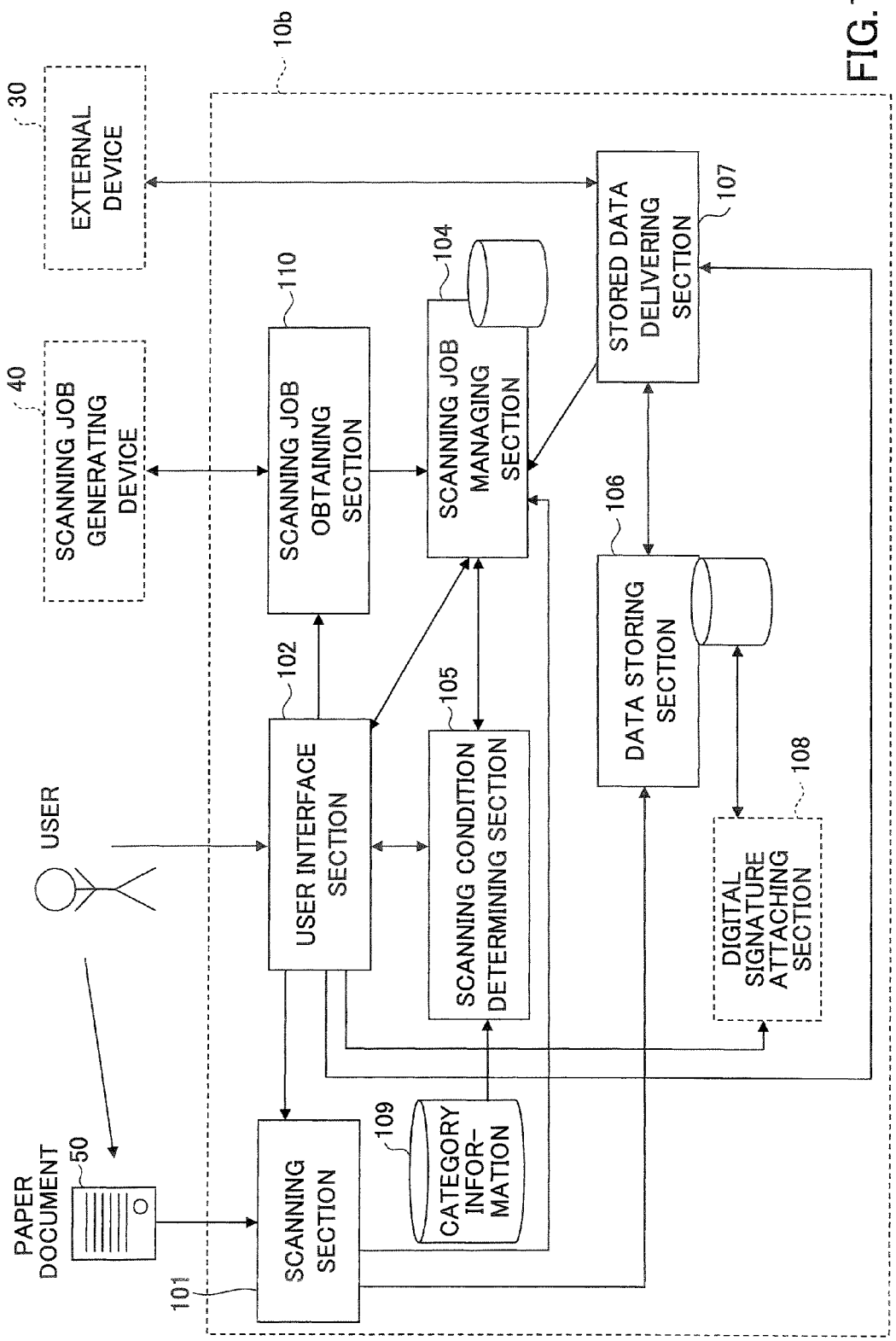
FIG. 17 is a functional diagram of a scanner shown in FIG. 16.

FIG. 17 is a functional diagram of the scanner 10*b* shown in FIG. 16. In FIG. 17, a same element as that shown in FIG. 3 has the same reference number; therefore, the same description is omitted.

As shown in FIG. 17, the scanner 10*b* includes a scanning job obtaining section 110 instead of the scanning job receiving section 103 shown in FIG. 3. The scanning job obtaining section 110 obtains the scanning job stored in the scanning job server 40.

Figure 18:
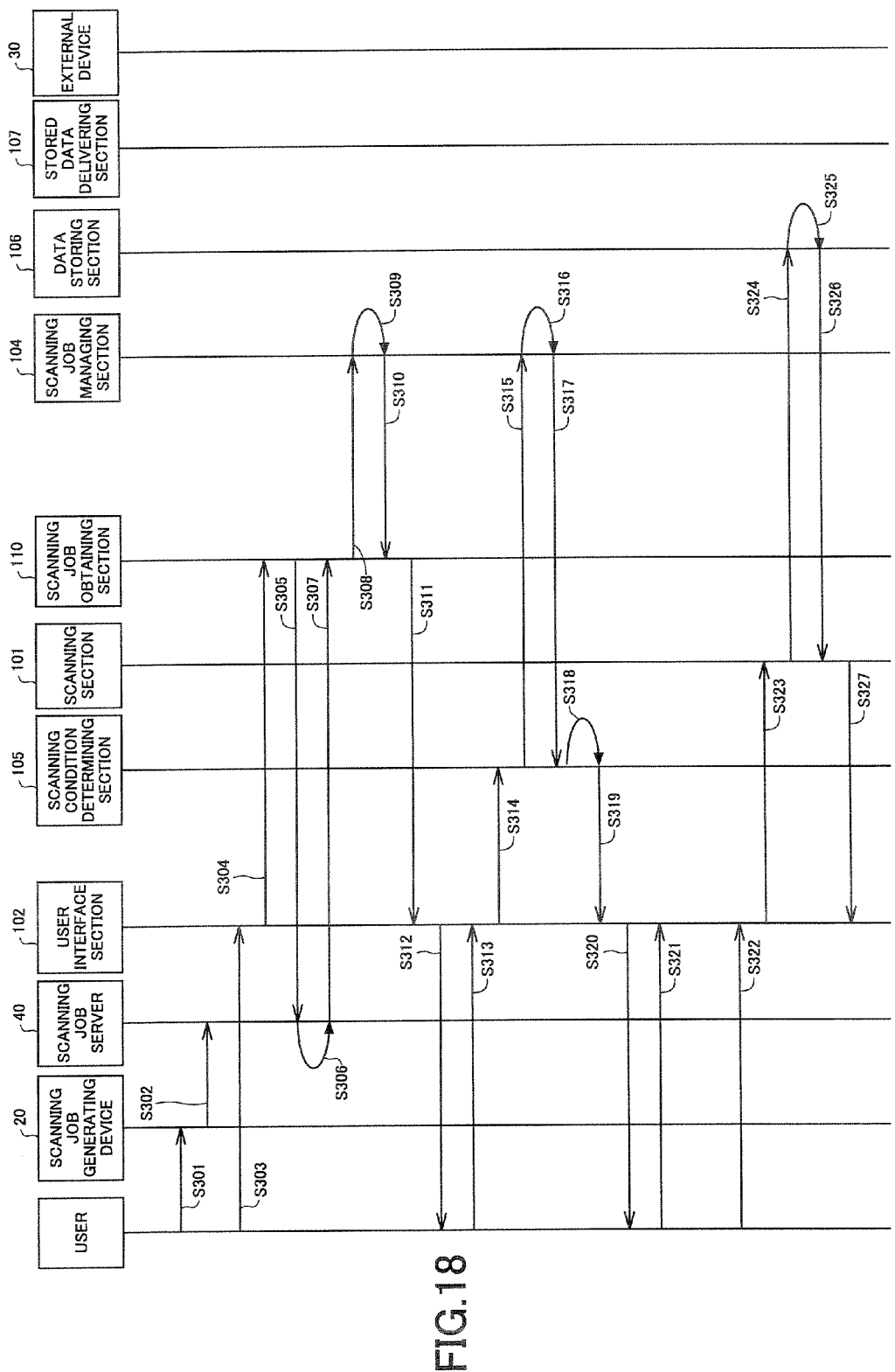
FIG. 18 is a first sequence chart showing processes to execute the scanning job in the scanning system according to the third embodiment of the present invention.
Figure 19:
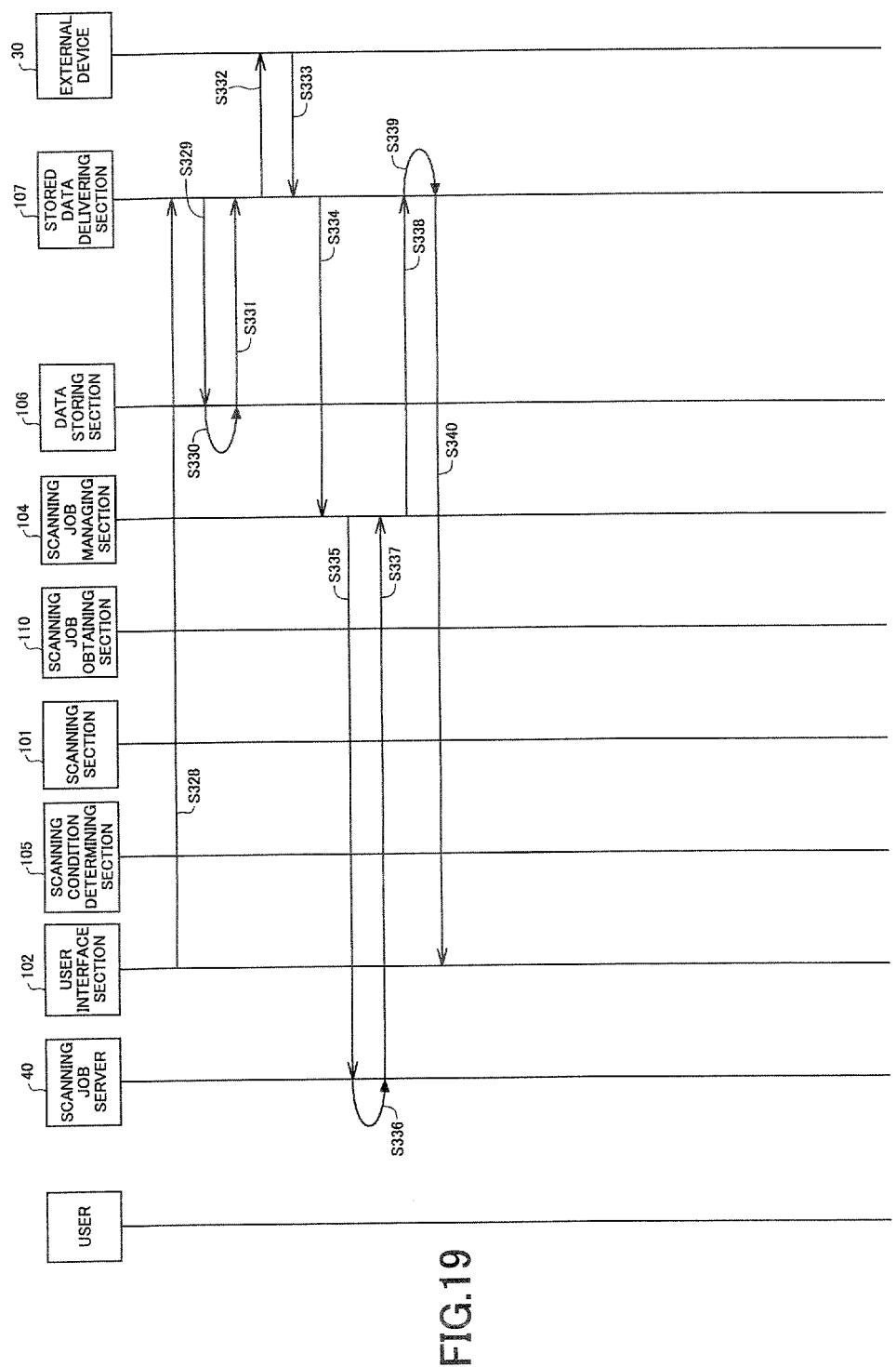
FIG. 19 is a second sequence chart showing processes to execute the scanning job in the scanning system according to the third embodiment of the present invention.

Next, referring to the drawings, processes in the scanning system 2 according to the third embodiment of the present invention are described. FIG. 18 is a first sequence chart showing processes to execute the scanning job in the scanning system 2 according to the third embodiment of the present invention. FIG. 19 is a second sequence chart showing processes to execute the scanning job in the scanning system 2 according to the third embodiment of the present invention.

Referring to FIGS. 18 and 19, the processes are described. First, a user instructs the scanning job generating device 20 to generate a scanning job (S301). At the time of the instruction, at least a document category is designated. The scanning job generating device 20 generates the scanning job including the document category based on the instruction of the user and transmits a request message for executing the scanning job to the scanning job server 40 (S302). The request message can be the same as that shown in FIG. 6.

Next, the user moves to the scanner 10*b*. Therefore, processes from S303 on are asynchronously executed with the processes S301 and S302. In this, it is preferable that user authentication be executed by using biometrics or a password of the user before operating the scanner 10*b*.

When the user instructs to display a scanning job by operating the operating panel 14 of the scanner 10*b* (S303), the user interface section 102 requests the scanning job obtaining section 110 to obtain a scanning job (S304). When the scanning job obtaining section 110 requests the scanning job server 40 to transmit the scanning job stored in the scanning job server 40 (S305), the scanning job server 40 reads the scanning job stored therein (S306), and transmits the read scanning job to the scanning job obtaining section 110 (S307). When plural scanning jobs are stored in the scanning job server 40, the plural scanning jobs are transmitted to the scanning job obtaining section 110 as a scanning job list.

Next, when the scanning job obtaining section 110 requests the scanning job managing section 104 to store the scanning job (S308), the scanning job managing section 104 stores the scanning job in, for example, the HDD 16 (S309). When the scanning job obtaining section 110 receives a notification that the scanning job is stored (S310), the scanning job obtaining section 110 sends the scanning job to the user interface section 102 (S311). The user interface section 102 displays the scanning job on the operating panel 14 (S312). When the plural scanning jobs exist, the scanning job list is displayed.

Processes from S313 shown in FIG. 18 through S334 shown in FIG. 19 are the same as the processes from S113 through S134 in the first embodiment. Therefore, the same description is omitted.

Next, referring to FIG. 19, processes from S335 on are described. When the scanning job managing section 104 receives a notification that the scanning job is normally delivered from the stored data delivering section 107, the scanning job managing section 104 sends the notification to the scanning job server 40 (S335), the scanning job server 40 changes the status of the selected job to, for example, "Completion" (S336), and sends the changed result to the scanning job managing section 104 (S337).

The scanning job managing section 104 informs the stored data delivering section 107 about the changed result (S338). When the status of the scanning job is normally changed, the stored data delivering section 107 deletes the delivery data (S339), and informs the user interface section 102 of the delivered result (S340). The user interface section 102 informs the user of the delivery completion by displaying the delivered result on the operating panel 14.

As described above, according to the scanning system 2 in the third embodiment of the present invention, the scanning job can be managed by the scanning job server 40. Therefore, the workload on the scanner 10*b* can be reduced and also the same effect as that in the first embodiment can be obtained. In the third embodiment of the present invention, the scanner 10*b* is the PULL type. The PULL type scanner can also be applied to the second embodiment of the present invention.

Next, referring to the drawings, a fourth embodiment of the present invention is described. In the fourth embodiment of the present invention, in order to guarantee the originality of scanned data to be stored, a digital signature is attached to the scanned data. In the fourth embodiment of the present invention, the scanning system 1 shown in FIG. 1 can be used. However, as the scanner, a scanner 10*c* is used.

Figure 20:
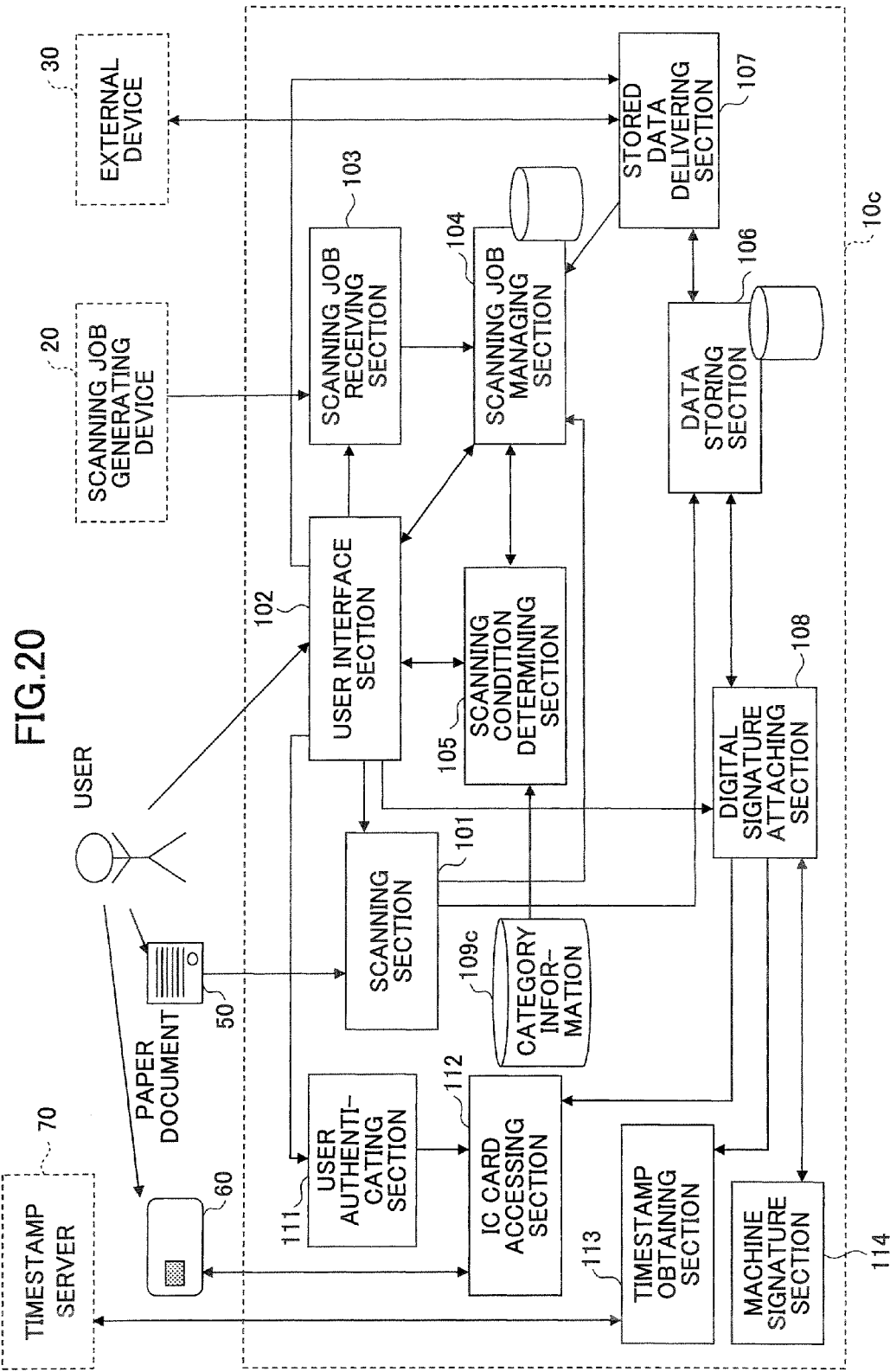
FIG. 20 is a functional diagram of a scanner according to a fourth embodiment of the present invention.

FIG. 20 is a functional diagram of the scanner 10*c* according to the fourth embodiment of the present invention. In FIG. 20, a same element as that shown in FIG. 3 has the same reference number, and the description of the same element is omitted.

As shown in FIG. 20, the scanner 10*c* additionally includes a user authenticating section 111, an IC card accessing section 112, a timestamp obtaining section 113, and a machine signature section 114.

The user authenticating section 111 authenticates a user based on a secret code, for example, a password in an IC card of the user who operates the scanner 10*c*. In the user authentication, biometrics using a fingerprint, an iris scan, or a vein pattern of the user can be used instead of the IC card.

The IC card accessing section 112 encrypts an MD (message digest) generated by applying a hash function to the scanned data with a proper user secret key (hereinafter referred to as a user private key), and generates a proper user digital signature (hereinafter referred to as a user signature) for the scanned data. Specifically, the IC card accessing section 112 causes the IC card 60 in which the user private key is recorded to generate the user signature. In order to maintain the security, the user private key is managed so that the user private key cannot be taken out from the IC card 60. In the IC card 60, in addition to the secret code and the user private key, a public key certificate (hereinafter referred to as a user public key certificate) for the user private key is recorded. In the user public key certificate, a public key (hereinafter referred to as a user public key) for the user private key is included. The user public key certificate is issued by an authentication organization beforehand.

The timestamp obtaining section 113 obtains a timestamp from a timestamp server 70 connecting to the scanner 10*c* via a network such as the Internet. The timestamp server 70 is managed by, for example, a third party who supplies timestamp services.

The machine signature section 114 encrypts an MD generated by applying a hash function to scanning data by using a proper secret key of the scanner 10*c* (hereinafter referred to as a machine private key), and generates a proper machine digital signature (hereinafter referred to as a machine signature) for the scanned data. In the scanner 10c, a public key certificate (hereinafter referred to as a machine public key certificate) for the machine private key is recorded. In the machine public key certificate, a public key (hereinafter referred to as a machine public key) for the machine private key is included. The machine public key certificate is issued by an authentication organization beforehand.

Next, referring to the drawings, processes in the scanning system 1 according to the fourth embodiment of the present invention are described.

Figure 21:
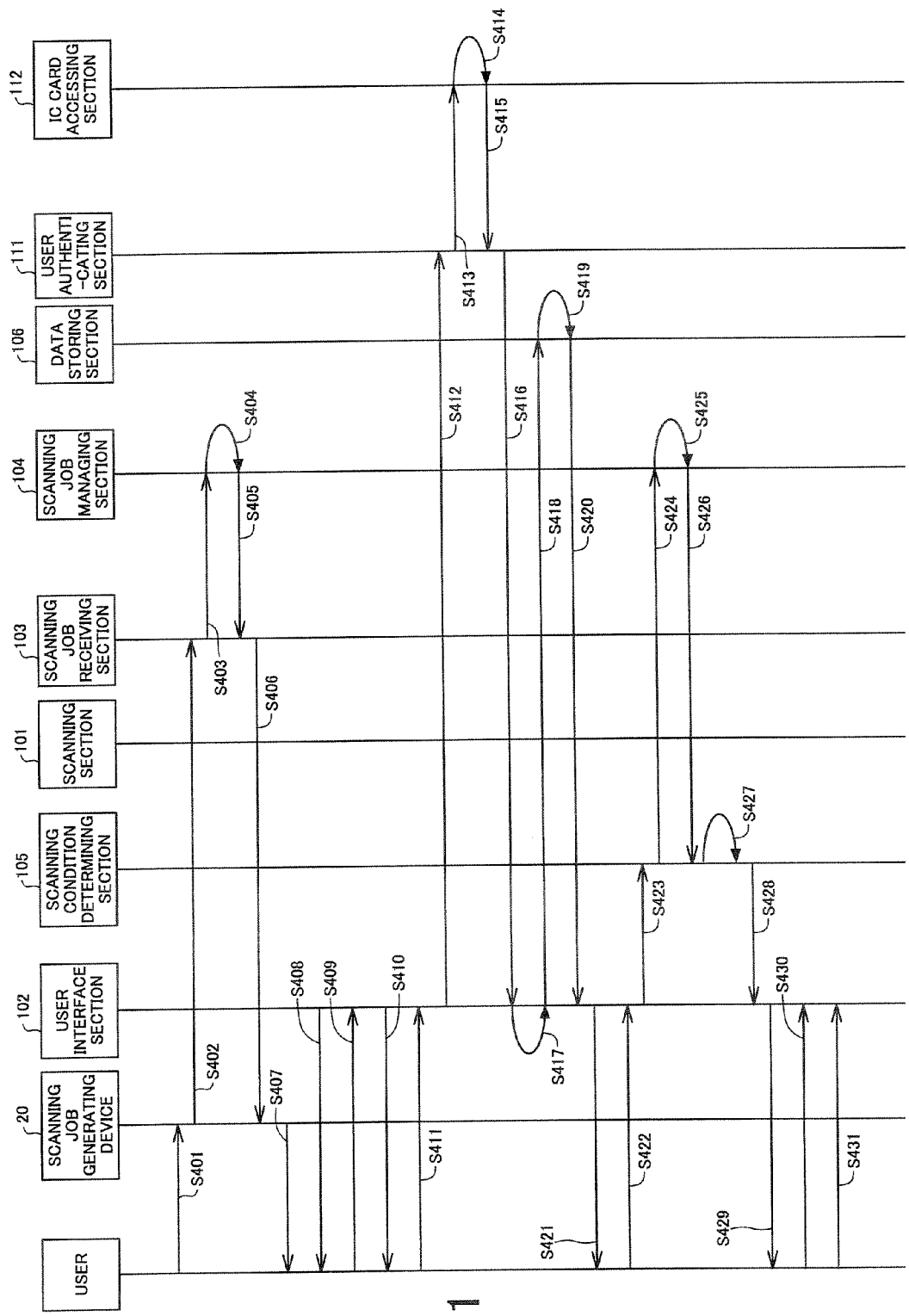
FIG. 21 is a first sequence chart showing processes to execute the scanning job in the scanning system according to the fourth embodiment of the present invention.
Figure 22:
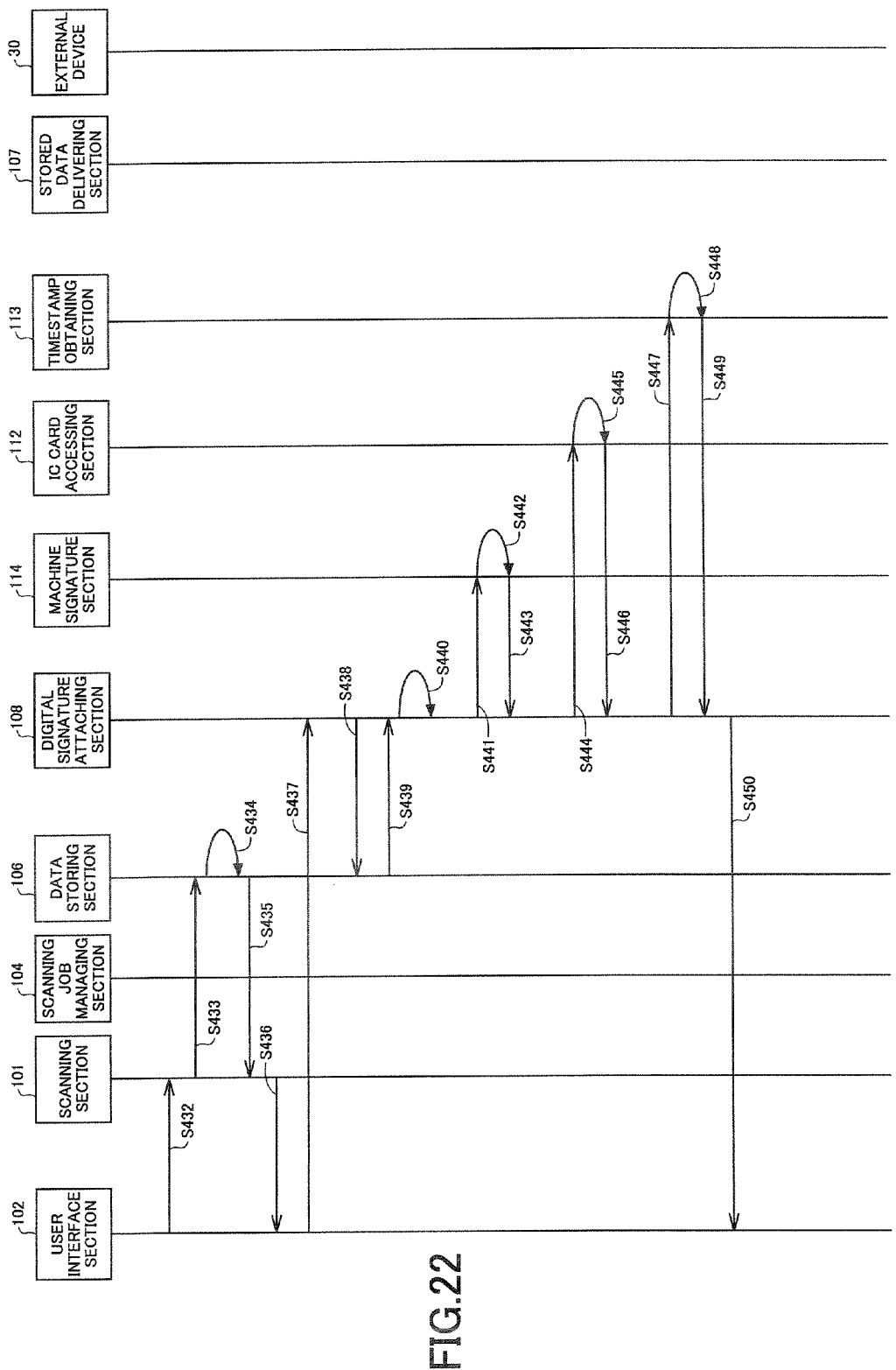
FIG. 22 is a second sequence chart showing processes to execute the scanning job in the scanning system according to the fourth embodiment of the present invention.
Figure 23:
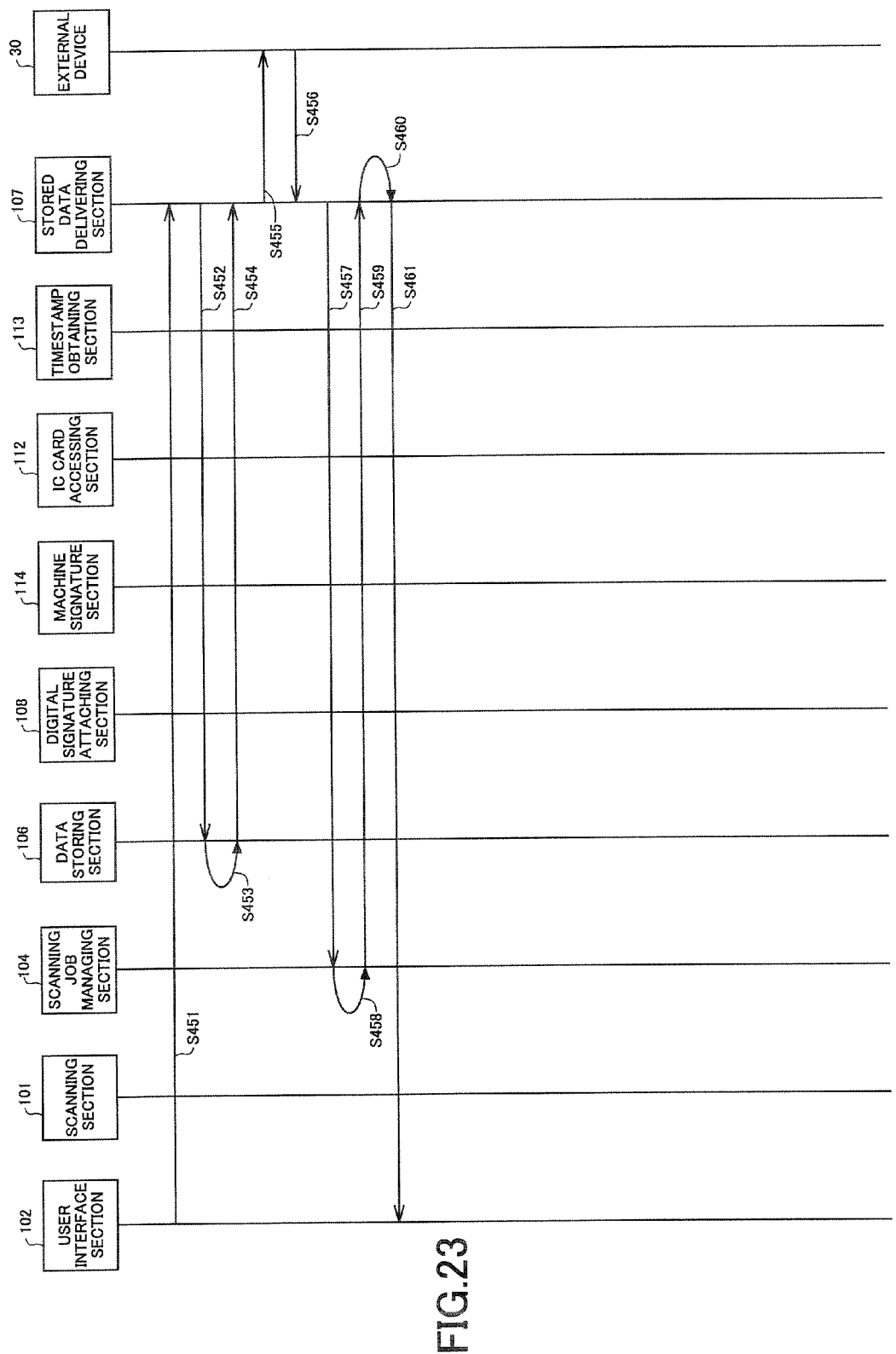
FIG. 23 is a third sequence chart showing processes to execute the scanning job in the scanning system according to the fourth embodiment of the present invention.

FIG. 21 is a first sequence chart showing processes to execute the scanning job in the scanning system 1 according to the fourth embodiment of the present invention. FIG. 22 is a second sequence chart showing processes to execute the scanning job in the scanning system 1 according to the fourth embodiment of the present invention. FIG. 23 is a third sequence chart showing processes to execute the scanning job in the scanning system 1 according to the fourth embodiment of the present invention.

In FIG. 21, processes from S401 through S407 are the same as the processes from S101 through S107 shown in FIG. 4; therefore the same descriptions are omitted. However, a request message of a scanning job which is transmitted in S402 is shown in FIG. 24.

FIG. 24 is a first example of the request message for executing the scanning job according to the fourth embodiment of the present invention.

In a request message r401 shown in FIG. 24, a value of a JobName element r401-1 is different from the value of the JobName element r101-21 shown in FIG. 6, and a value of a JobCategory element r401-2 is different from the value of the JobCategory element r101-41 shown in FIG. 6. That is, the job name and the job category are different from those shown in FIG. 6. In the fourth embodiment of the present invention, the document category of the paper document is "Receipt".

Next, the user moves to the scanner 10c. Therefore, processes from S408 on are asynchronously executed with the processes from S401 through S407.

When the scanner 10c is in a standby mode, that is, waits for an input by a user, the user interface section 102 displays a message which requests the user to insert the IC card 60 into a card reader (not shown) of the scanner 10c or submit the IC card 60 to the scanner 10c on the operating panel 14 (S408) Hereinafter, "insert" is used even if the IC card 60 is a contactless type. When the user inserts the IC card 60 into the card reader of the scanner 10c (S409), the user interface section 102 displays a message which requests the user to input an IC card identification code on the operating panel 14 (S410). When the user inputs the IC card identification code via the operating panel 14 (S411), the user interface section 102 requests the user authenticating section 111 to authenticate the user by informing the user authenticating section 111 about the IC card identification code (S412).

When the user authenticating section 111 informs the IC card accessing section 112 about the IC card identification code, the IC card accessing section 112 authenticates the user by using the IC card 60 (S414). That is, the IC card accessing section 112 informs the IC card 60 about the IC card identification code, and the IC card 60 collates the IC card identification code with the secret code recorded in the IC card 60; with this, the user is authenticated. The IC card accessing section 112 informs the user authenticating section 111 of the authenticated result (S415), and also informs the user interface section 102 of the authenticated result.

When the user is authenticated, the user interface section 102 displays the authenticated result on the operating panel 14 (S417). Then, the user interface section 102 requests the data storing section 106 to obtain the scanning job list (S418).

Next, processes from S419 through S436 are executed. However, the processes from S419 through S436 shown in FIG. 22 are almost the same as the processes from S110 through S127 shown in FIG. 4. That is, in the fourth embodiment of the present invention, category information 190c shown in FIG. 25 is used instead of the category information 109 shown in FIG. 7.

FIG. 25 is a definition example of the category information 109c according to the fourth embodiment of the present invention. In FIG. 25, points different from those shown in FIG. 7 are described.

In the category information 109c shown in FIG. 25, the value of the DocumentCategory element 109c-1 is "Receipt". Therefore, the category information 109c is applied to a receipt. In addition, the value of the ColorEncoding element 190c-2 is "Color", and the value of the AllowedValues attribute is also "Color". Therefore, the default value of the image type is "Color", and a change to other image types is restricted. The value of the Resolution element 109c-4 is "200", the value of the AllowedValues attribute is "200 300 400 600". Therefore, the default value of the resolution is 200 dpi, and the acceptable value is 200, 300, 400, or 600 dpi.

In addition, in the category information 109c, a DigitalSignature element 109c-5 is set. In the DigitalSignature element 109c-5, information as to whether a digital signature (electronic signature) is attached to the scanned data is set. Hereinafter, the information is referred to as digital signature attaching information. The DigitalSignature element 109c-5 includes a MachineSignature element 109c-51, a UserSignature element 109c-52, and a TimeStamp element 109c-53 as sub elements.

The default value of the digital signature attaching information is set as "True False" in each of the above elements. In addition, in the AllowedValues attribute of each element, an acceptable value of the digital signature attaching information is set. In the document category 109c, "True" signifies that a digital signature is attached, and "False" signifies that a digital signature is not attached. In the category information 109C shown in FIG. 25, the machine signature and the timestamp are attached and the user signature is not attached. Attaching the machine signature or the user signature can be changed on the operating panel 14 depending on the acceptable value.

FIG. 26 is a first example of a scanning condition setting screen 145 on the operating panel 14 according to the fourth embodiment of the present invention.

Therefore, in S429, the scanning condition setting screen 145 is shown based on the request message r401 shown in FIG. 24 and the category information 109c shown in FIG. 25.

In the scanning condition setting screen 145 shown in FIG. 26, as the image type, "COLOR" is selected based on the ColorEncoding element 109c-2 shown in FIG. 25, and the other image types cannot be selected. In addition, as the resolution, "200" is selected based on the Resolution element 109c-4, and "300" "400", or "600" can be selected.

In addition, as the digital signature attaching information, ON of the machine signature, OFF of the user signature, and ON of the timestamp are selected based on the DigitalSignature element 109c-5, and any of the digital signatures can be changed. In this, ON signifies to attach, and OFF signifies not to attach. Therefore, in this case, the user can make OFF in the machine signature, make ON in the user signature, and make OFF in the timestamp.

Processes from S419 shown in FIG. 21 through S436 shown in FIG. 22 are the same as those in the first embodiment of the present invention; therefore, the same descriptions are omitted.

When attaching at least one of the machine signature, the user signature, and the timestamp is set, the user interface section 102 requests the digital signature section 108 to generate a digital signature for the scanned data (S437). The digital signature section 108 obtains the scanned data from the data storing section 106 (S438, S439), and generates an MD of the scanned data by applying a hash function to the scanned data (S440).

When attaching the machine signature is set, the digital signature section 108 outputs the MD to the machine signature section 114 and requests the machine signature section 114 to generate a machine signature (S441). The machine signature section 114 generates the machine signature for the scanned data by encrypting the MD using a machine private key stored in, for example, the HDD 16 (S442). Then, the machine signature section 114 outputs a machine signature result in which the generated machine signature and a machine public key certificate are included to the digital signature section 108 (S443).

When the user signature is attached, the digital signature section 108 outputs the MD to the IC card accessing section 112, and requests the IC card accessing section 112 to generate a user signature (S444). The IC card accessing section 112 generates the user signature for the scanned data by using the IC card 60 (S445). Specifically, the IC card accessing section 112 inputs the MD in the IC card 60 and requests the IC card 60 to generate the user signature. The IC card 60 generates the user signature for the scanned data by encrypting the MD with the user private key stored in the IC card 60. Then, the IC card 60 outputs the generated user signature and the user public key certificate to the IC card accessing section 112. The IC card accessing section 112 outputs the user signature result in which the generated user signature and the user public key certificate are included to the digital signature section 108 (S446).

When the timestamp is attached, the digital signature section 108 outputs the MD to the timestamp obtaining section 113, and requests the timestamp obtaining section 113 to obtain a timestamp (S447). The timestamp obtaining section 113 obtains the timestamp for the scanned data from the timestamp server 70 (S448). Specifically, the timestamp obtaining section 113 requests the timestamp server 70 to generate a timestamp for the scanned data with the MD. The timestamp server 70 generates the timestamp (digital signature) by encrypting, for example, the MD and the present time using the private key of the timestamp server 70. Then, the timestamp server 70 outputs the generated time stamp and the public key certificate of the timestamp (hereinafter referred to as a timestamp public key certificate) to the timestamp obtaining section 113. The timestamp obtaining section 113 outputs the timestamp obtained result in which the obtained timestamp and the timestamp public key certificate are included to the digital signature section 108 (S449).

Next, the digital signature attaching section 108 outputs a generated or obtained digital signature (machine signature, user signature, or timestamp) and the public key certificate to the user interface section 102 as the digital signature result for the scanned data (S450).

Processes from S451 on shown in FIG. 23 are almost the same as those from S128 on shown in FIG. 5 in the first embodiment of the present invention. That is, in the fourth embodiment of the present invention, in S455, a digital signature of the machine signature, the user signature, or the timestamp which signature is attached and the public key certificate are delivered to the external device 30. The external device 30 manages the scanned data with the digital signature.

In the fourth embodiment of the present invention, a digital signature is attached to the scanned data. Attaching the digital signature can also be applied to the second and the third embodiments of the present invention.

That is, when the digital signature is attached to the scanned data in the second embodiment of the present invention, the category information 109c is not absolutely necessary in the scanner 10c. In addition, in S402, for example, the request message r402 shown in FIG. 27 is transmitted.

FIG. 27 is a second example of the request message for executing the scanning job according to the fourth embodiment of the present invention.

In FIG. 27, points different from those shown in FIG. 12 are described.

In the request message r402 in the fourth embodiment of the present invention, a DigitalSignature element r402-1 which shows digital signature attaching information is set. The structure of the DigitalSignature element r402-1 is the same as that in the category information 109c shown in FIG. 25. In FIG. 27, a machine signature and a timestamp are attached and a user signature is not attached.

Figure 28:
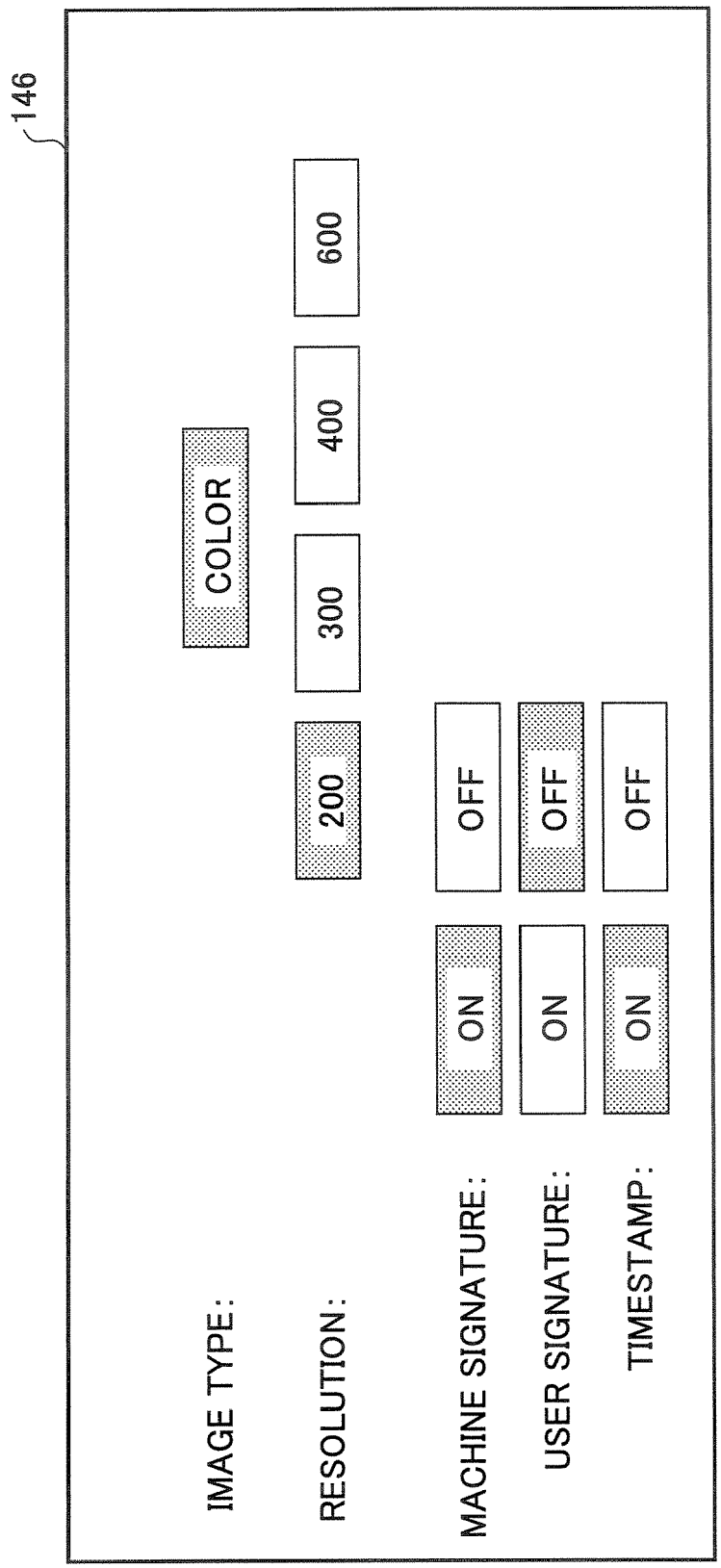
FIG. 28 is a second example of a scanning condition setting screen on the operating panel according to the fourth embodiment of the present invention.

FIG. 28 is a second example of a scanning condition setting screen on the operating panel 14 according to the fourth embodiment of the present invention.

Therefore, in S429, a scanning condition setting screen 146 shown in FIG. 28 is displayed based on the request message r402 shown in FIG. 27.

In the scanning condition setting screen 146 shown in FIG. 28, based on the DigitalSignature element r402-1, the machine signature is ON, the user signature is OFF, and the timestamp is ON.

As described above, according to the scanning system 1 in the fourth embodiment of the present invention, a machine signature proper to the scanner 10c and a user signature proper to a user who scans the paper document 50 can be attached to the scanned data of the paper document 50. Therefore, falsification of the scanned data at forming the scanned data can be prevented; further, falsification of the paper document 50 at scanning can be prevented.

That is, since the machine signature is generated for the scanned data right after forming the scanned data by scanning the paper document 50, when the scanned data are falsified after generating the machine signature, the falsification of the scanned data can be detected by verifying the machine signature. In addition, since the user who scans the paper document 50 can be identified by the user signature and the user signature is attached to the scanned data, it is difficult to falsify the paper document 50 at the time of scanning the paper document 50.

In addition, in the scanner 10c of the fourth embodiment of the present invention, since a timestamp which guarantees time by a third party is attached to the scanned data, the time when the scanned data are generated can be easily verified.

In addition, when a digital signature is attached to the scanning job, a change of the digital signature on the operating panel 14 can be restricted, based on the digital signature attaching information in the scanning job and the category information 109c. Therefore, when a digital signature must be attached to the scanned data due to the rule in the organization or the law, scanning data without the digital signature due to a lack of understanding of the scanning conditions or an operating error of the scanner can be prevented.

That is, the scanning system 1 according to the fourth embodiment of the present invention can be a suitable system in compliance with the electronic document law.

In the fourth embodiment of the present invention, when the condition change restricting level is "Prohibited", the default value cannot be changed to a value other than the value defined in the category information 109c.

For example, in the fourth embodiment of the present invention, a case is studied. In which, the category information 109c shown in FIG. 25 is used and a request message r403 shown in FIG. 29 is used, which request message is transmitted in S402.

FIG. 29 is a third example of the request message for executing the scanning job according to the fourth embodiment of the present invention.

In FIG. 29, points different from the request message r401 shown in FIG. 24 are described.

Figure 30:
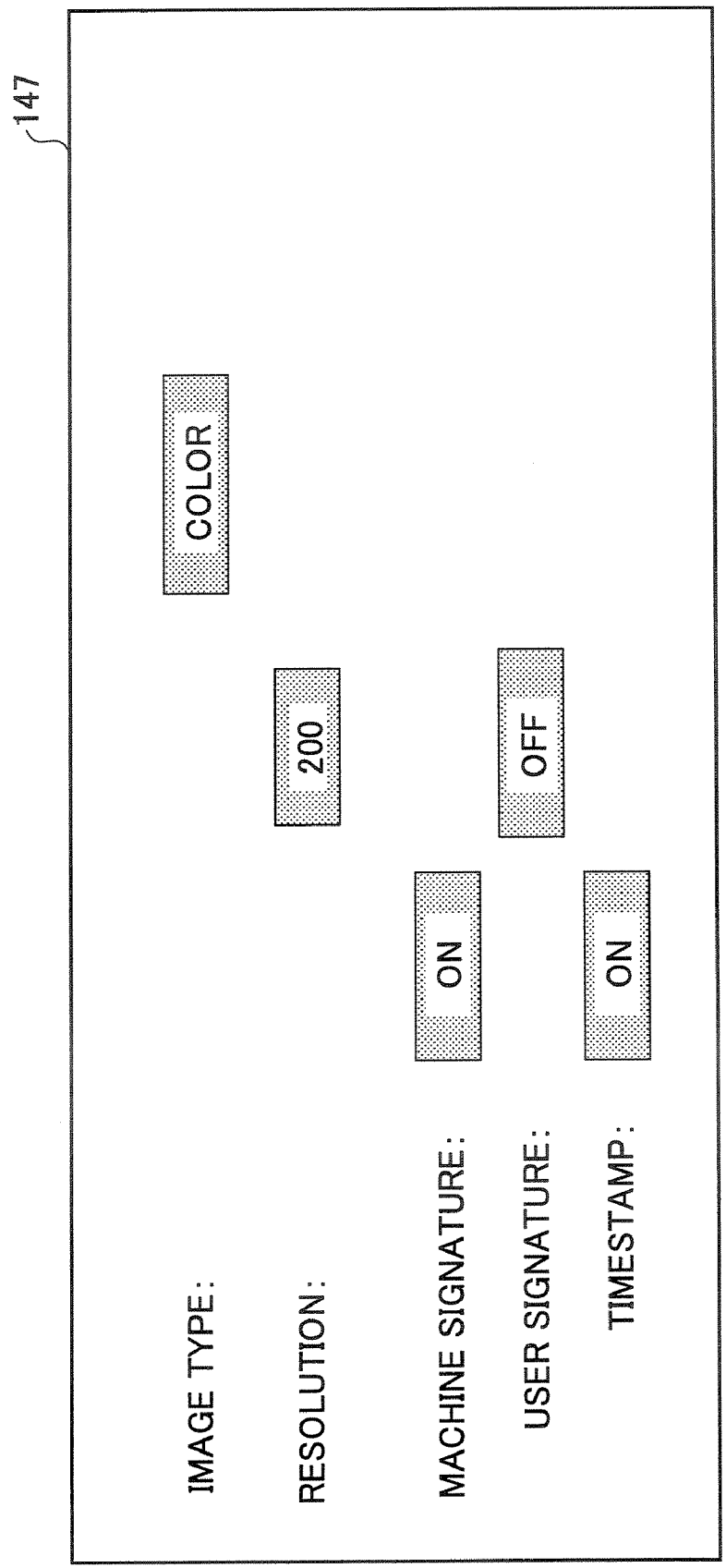
FIG. 30 is a third example of a scanning condition setting screen on the operating panel according to the fourth embodiment of the present invention.

In the request message r403 shown in FIG. 29, in the ParameterModification element r403-1, which is the condition change restricting level, "Prohibited" is designated. In this case, a scanning condition setting screen shown in FIG. 30 is displayed. FIG. 30 is a third example of the scanning condition setting screen on the operating panel 14 according to the fourth embodiment of the present invention.

In a scanning condition setting screen 147 shown in FIG. 30, the default values set in the category information 109c shown in FIG. 25 are selected. That is, as the image type, the resolution, the machine signature, the user signature, and the timestamp, the corresponding default values are selected. In addition, buttons for selecting values other than the default values are not displayed due to the scanning condition restricting level "Prohibited" set in the request message r403 shown in FIG. 29.

In this, the change of the default value by the user is prevented on the operating panel 14; however, there is a case where a value other than the default value set in the category information 109c is desired to be set. For example, when a scanning condition set in the scanning job is higher than the default value set in the category information 19c, for example, the resolution set in the scanning job is higher than the default value, it may be a low risk to permit a value other than the default value in the scanning job.

Next, a fifth embodiment of the present invention is described.

In the fifth embodiment of the present invention, the user is prevented from changing the scanning conditions on the operating panel 14; however, a value other than the default value set in the category information 109c can be set in the scanning job.

In the fifth embodiment of the present invention, the scanning system 1 shown in FIG. 1 is used and the scanner 10c shown in FIG. 20 is used. In addition, the processes are the same as those shown in FIGS. 21 through 23.

FIG. 31 is a definition example of category information 109d according to the fifth embodiment of the present invention. In the category information 109d, a definition is added to the category information 109c. In the definition, the scanning conditions set in the scanning job override the scanning conditions set in the category information 109c. That is, overriding information is added. In FIG. 31, points different from those shown in FIG. 25 are described.

As shown in FIG. 31, in the category information 109d, a ParameterOverride element 109d-1 is added as the overriding information. The value of the ParameterOverride element 109d-1 is "True" or "False". When the value is "True", overriding is permitted and when the value is "False", the overriding is not permitted. That is, when the value is "True", the scanning conditions set in the scanning job override the scanning conditions set in the category information 109c. As shown in FIG. 31, the override is permitted.

In the category information 109d shown in FIG. 31, the default value of the resolution is "200", the default value of the machine signature is "True", the default value of the user signature is "False", and the default value of the timestamp is "True". That is, the default values are the same as those shown in FIG. 25.

FIG. 32 is a request message r501 for executing the scanning job according to the fifth embodiment of the present invention. The request message r501 is transmitted in S402. In FIG. 32, points different from those shown in FIG. 29 are described.

In the request message r501, the resolution is "400" in the Resolution element r501-1, in addition, the machine signature is "True", the user signature is "True", and the timestamp is "True" in the DigitalSignature element r501-2. Further, in the ParameterModification element r501-3, the condition change restricting level is "Prohibited", that is, this is the same as that shown in FIG. 29.

FIG. 33 is a scanning condition setting screen 148 on the operating panel 14 according to the fifth embodiment of the present invention.

As shown in FIG. 33, the scanning condition setting screen 148 is displayed on the operating panel 14 based on the category information 109d and the request message r501.

In the scanning condition setting screen 148 shown in FIG. 33, the image type is "COLOR", which is the default value set by the category information 109d. However, in the resolution and the digital signature attaching information, values set in the request message r501 are used. That is, the values set in the request message r501 override the values set in the category information 109d. That is, the resolution in the category information 109d is "200"; however, in the request message r501, "400" is to be set. Therefore, the resolution is "400". In addition, the user signature is "False" as the default value in the category information 109d; however, in the request message r501, "True" is to be set. Therefore, the user signature is "ON".

The scanning condition setting screen 148 shown in FIG. 33 is displayed on the operating panel 14 by a part of the process of S427 shown in FIG. 21.

Figure 34:
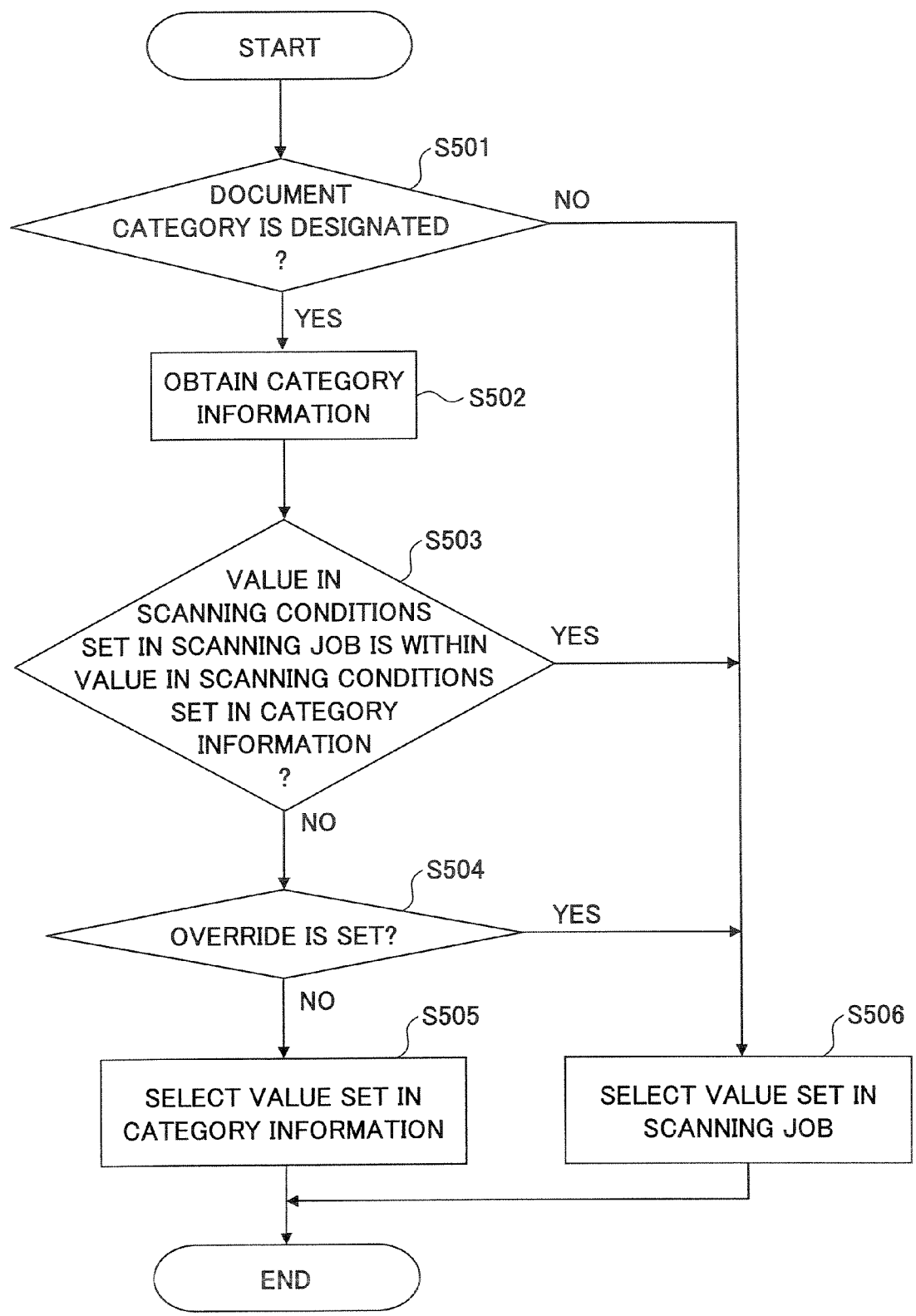
FIG. 34 is a flowchart showing processes to display a scanning condition setting screen according to the fifth embodiment of the present invention.

FIG. 34 is a flowchart showing processes to display the scanning condition setting screen 148 according to the fifth embodiment of the present invention. The processes shown in FIG. 34 are executed by the scanning condition determining section 105.

First, it is determined whether a document category is designated in a scanning job (request message r501) (S501). When the document category is not designated (NO in S501), a value in the scanning conditions set in the scanning job is selected (S506).

When the document category is designated (YES in S501), the category information 109d corresponding to the document category is obtained (S502). Next, it is determined whether a value in the scanning conditions set in the scanning job is within a value in the scanning conditions (default value) set in the category information (S503). When the value in the scanning conditions set in the scanning job is within the value in the scanning conditions set in the category information (YES in S503), the value in the scanning conditions set in the scanning job is selected (S506).

When the value in the scanning conditions set in the scanning job is without the value in the scanning conditions set in the category information (NO in S503) it is determined whether override is set (S504), that is, it is determined whether overriding information in which the request message r501 overrides the category information 109d is "True" in the ParameterOverride element 109d-1 (S504). When the ParameterOverride element 109d-1 is "True" (YES in S504), the value in the scanning conditions set in the scanning job is selected (S506).

When the ParameterOverride element 109d-1 is "False" or is not defined (NO in S504), the value in the scanning conditions set in the category information 109d is selected (S505).

As described above, according to the fifth embodiment of the present invention, a value other than the default value set in the category information 109c can be set in the scanning job while the change by the user on the operating panel 14 is prevented. Therefore, for example, in a system for executing a scanning job, a scanning condition which is harder than that in the category information 109c can be set. That is, a flexible system can be realized.

Further, the present invention is not limited to the specifically disclosed embodiments, and variations and modifications may be made without departing from the scope of the present invention.

The present invention is based on Japanese Priority Patent Application No. 2006-013166, filed on Jan. 20, 2006, with the Japanese Patent Office, the entire contents of which are hereby incorporated herein by reference.

What is claimed is:

1. A document processing apparatus, comprising:
a scanning condition managing unit for managing a plurality of scanning conditions to be applied to the document based on a category of the document;
a scanning request obtaining unit for obtaining a scanning request for the document via a network;
a document category determining unit for determining the category of the document which document is an object of the scanning request;
a scanning condition determining unit for determining a scanning condition which is to be applied to the document, which is the object of the scanning request, on the basis of the category determined by the document category determining unit and the scanning conditions managed by the scanning condition managing unit; and
a condition inputting unit for enabling a user to input another scanning condition,
wherein:
the document is scanned based on the scanning condition determined by the scanning condition determining unit, and
the condition inputting unit, based on a result determined by the scanning condition determining unit, replaces a part of the scanning condition in the scanning condition to be applied to the document, which is the object of the scanning request, with the other scanning condition.

2. The apparatus as claimed in claim 1, further comprising:
a scanning condition displaying unit for displaying the scanning condition determined by the scanning condition determining unit.

3. The apparatus as claimed in claim 1, wherein:
the scanning condition determining unit gives priority to another scanning condition included in the scanning request compared to the scanning condition managed in the scanning condition managing unit when at least a part of another scanning condition is included in the scanning request.

4. The apparatus as claimed in claim 1, wherein:
the scanning condition determining unit gives priority to another scanning condition included in the scanning request when it is defined to give priority to the other scanning condition included in the scanning request in the scanning conditions managed by the scanning condition managing unit.

5. The apparatus as claimed in claim 1, further comprising:
a machine signature generating unit for generating a first digital signature for a scanned image by using a secret key proper for the document processing apparatus.

6. The apparatus as claimed in claim 5, wherein:
the machine signature generating unit generates the first digital signature when attaching the first digital signature is requested at least either in one of the scanning conditions managed by the scanning condition managing unit or in another scanning condition in the scanning request.

7. The apparatus as claimed in claim 1, further comprising:
a user signature generating unit for generating a second digital signature for a scanned image by using a secret key proper for a user of the document processing apparatus.

8. The apparatus as claimed in claim 7, wherein:
the user signature generating unit generates the second digital signature when attaching the second digital signature is requested at least either in one of the scanning conditions managed by the scanning condition managing unit or in another scanning condition in the scanning request.

9. The apparatus as claimed in claim 1, further comprising:
a timestamp obtaining unit for obtaining a timestamp for a scanned image via a network; wherein
the timestamp obtaining unit obtains the timestamp when attaching the timestamp is requested at least either in one of the scanning conditions managed by the scanning condition managing unit or in another scanning condition in the scanning request.

10. A document processing apparatus, comprising:
a scanning request obtaining unit for obtaining a scanning request for the document via a network;
a scanning condition obtaining unit for obtaining a scanning condition to be applied to the document which document is an object of the scanning request;
a condition inputting unit for a user to input another scanning condition; and
a machine signature generating unit for generating a first digital signature for a scanned image by using a secret key proper for the document processing apparatus,
wherein:
the document is scanned based on the scanning condition obtained by the scanning condition obtaining unit, and
the condition inputting unit permits changing to include the other scanning condition within the scanning condition obtained by the scanning condition obtaining unit.

11. The apparatus as claimed in claim 10, further comprising:
a scanning condition displaying unit for displaying the scanning condition obtained by the scanning condition obtaining unit.

12. The apparatus as claimed in claim 10, wherein:
the machine signature generating unit generates the first digital signature when attaching the first digital signature is requested in the scanning request.

13. The apparatus as claimed in claim 10, further comprising:
a user signature generating unit for generating a second digital signature for a scanned image by using a secret key proper for a user of the document processing apparatus.

14. The apparatus as claimed in claim 13, wherein:
the user signature generating unit generates the second digital signature when attaching the second digital signature is requested in the scanning request.

15. The apparatus as claimed in claim 10, further comprising:
a timestamp obtaining unit for obtaining a timestamp for a scanned image via a network; wherein
the timestamp obtaining unit obtains the timestamp when attaching the timestamp is requested in the scanning request.

16. A document processing method in a document processing apparatus, comprising the steps of:
managing a plurality of scanning conditions to be applied to the document based on a category of the document;
obtaining a scanning request for the document;
determining the category of the document which document is an object of the scanning request;
determining the scanning condition to be applied to the document which document is the object of the scanning request which determined scanning condition is based on the determined category and is selected from the managed scanning conditions; and
inputting, by a user, another scanning condition; wherein
the document is scanned based on the another scanning condition which has been input, and
the inputting, based on a result determined by the determining the scanning condition, replaces a part of the scanning condition in the scanning condition to be applied to the document, which is the object of the scanning request, with the another scanning condition.

17. A non-transitory computer readable storage medium storing a program product for executing a document processing method of a document processing apparatus, wherein said program product executes the method as claimed in claim 16.

\* \* \* \* \*